United States Patent
Zhang et al.

(10) Patent No.: US 11,908,186 B2
(45) Date of Patent: Feb. 20, 2024

(54) SYSTEMS AND METHODS FOR OPTIMIZING ASSET MAINTENANCE PROTOCOLS BY PREDICTING VEGETATION-DRIVEN OUTAGES

(71) Applicant: MCKINSEY & COMPANY, INC., New York, NY (US)

(72) Inventors: Liangliang Zhang, Houston, TX (US); Alfonso Encinas Fernandez, New York, NY (US); Charlie Gascon, New York, NY (US); Derek Chu, Maynard, MA (US); Kelsey Elwood Carter, New York, NY (US); Nicolas Charles Michel Bellemans, Brussels (BE)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 18/184,619

(22) Filed: Mar. 15, 2023

(65) Prior Publication Data
US 2023/0298343 A1 Sep. 21, 2023

Related U.S. Application Data

(60) Provisional application No. 63/320,180, filed on Mar. 15, 2022.

(51) Int. Cl.
*G06V 20/10* (2022.01)
(52) U.S. Cl.
CPC .......... *G06V 20/188* (2022.01); *G06V 20/182* (2022.01); *G06V 2201/12* (2022.01)

(58) Field of Classification Search
CPC . G06V 20/188; G06V 20/182; G06V 2201/12
See application file for complete search history.

(56) References Cited

U.S. PATENT DOCUMENTS

| | | | |
|---|---|---|---|
| 2019/0228362 A1* | 7/2019 | Anagnostou | G06Q 10/0635 |
| 2021/0073692 A1* | 3/2021 | Saha | G06V 10/764 |
| 2021/0142537 A1* | 5/2021 | Abi-Rached | G06V 20/188 |

OTHER PUBLICATIONS

Dokic, Tatjana, and Mladen Kezunovic. "Predictive risk management for dynamic tree trimming scheduling for distribution networks." IEEE Transactions on Smart Grid 10.5 (2019): 4776-4785. (Year: 2019).*

(Continued)

*Primary Examiner* — Vu Le
*Assistant Examiner* — Tracy Mangialaschi
(74) *Attorney, Agent, or Firm* — MARSHALL, GERSTEIN & BORUN LLP

(57) ABSTRACT

Systems and methods for optimizing asset maintenance protocols by predicting vegetation-driven outages are disclosed. An example method includes determining, by one or more processors, a failure probability for each asset in a set of assets within a designated area. The example method further includes defining, by the one or more processors, an asset risk for each asset in the set of assets based on the failure probability, and clustering, by the one or more processors, vegetation within the designated area to determine a predicted vegetation-driven outage. The example method further includes optimizing, by the one or more processors, a set of asset maintenance protocols corresponding to the set of assets based on the asset risk and the predicted vegetation-driven outage.

20 Claims, 13 Drawing Sheets

(56) References Cited

OTHER PUBLICATIONS

Wanik DW, Parent JR, Anagnostou EN, Hartman BM. Using vegetation management and LiDAR-derived tree height data to improve outage predictions for electric utilities. Electric Power Systems Research. May 1, 2017;146:236-45. (Year: 2017).*

* cited by examiner

314

VegX 2.0　　　　　　　　　　　　　　　　　　Budget Selector

| SAIFI Scores Curve | Map Visualization-All Circuits |
|---|---|

| Curcuit | Likelihood of Outage | Years Since Last Complete Trim | Years Since Last Partial Trim | Total Circuit - Number Of Customers | Total Circuit - Expected Number Of Customers |
|---|---|---|---|---|---|
| Export | | | | | |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |
| xx | xxx | x | x | xx | xx |

| 12.000.000 ▼ | Logout | | |
|---|---|---|---|

| Map Visualization-Single Circuits | Table Summary | | |
|---|---|---|---|
| Total Circuit - Length | Recommendation For Next 12 Months | Recommendation For Months 12-24 | Recommendation For Months 24-36 |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |
| xx | xx | xx | xx |

FIG. 3D (Continued)

| SAIFI Scores Curve | Map Visualization-All Circuits | Map Visualization-Single Circuits | Table Summary | Location View | Virtual 3D |

Virtual 3D Field Visits Are Available On Demand

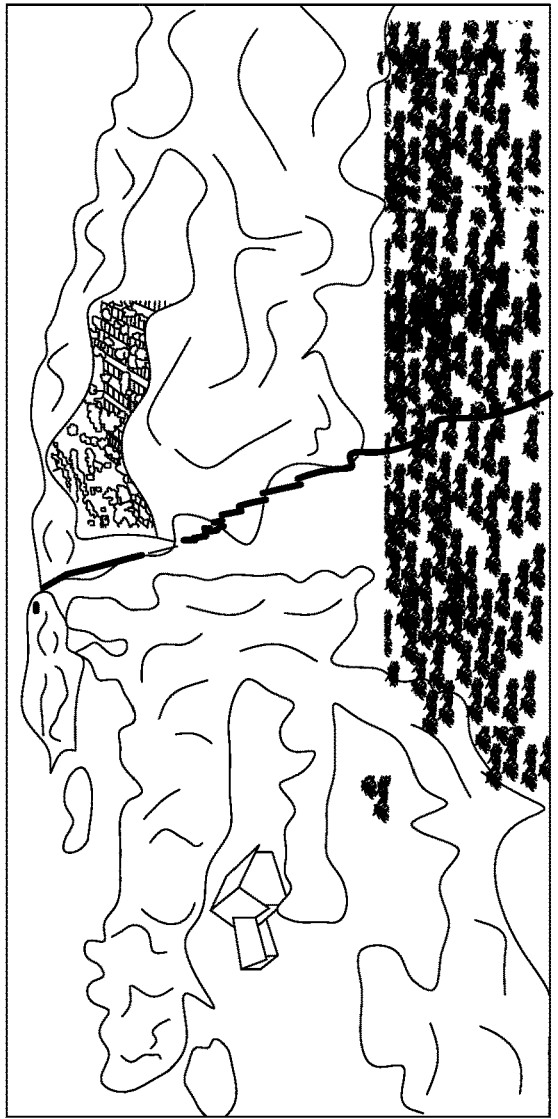

Notes

3D Virtual Visit Is Combining Lidar, Imagery And Asset Location Data to:
- Plan Work with Vegetation Manager
- Reduce Truck Rolls
- Verify Encroaching Vegetation Alerts From Analytics
- Pin Trimming Activities

FIG. 3F

SYSTEMS AND METHODS FOR OPTIMIZING ASSET MAINTENANCE PROTOCOLS BY PREDICTING VEGETATION-DRIVEN OUTAGES

CROSS-REFERENCE TO RELATED APPLICATIONS

This application claims priority to U.S. Provisional Patent Application No. 63/320,180, entitled "Systems and Methods for Optimizing Asset Maintenance Protocols by Predicting Vegetation-Driven Outages," filed on Mar. 15, 2022, the disclosure of which is hereby incorporated herein by reference.

FIELD OF THE DISCLOSURE

The present disclosure generally relates to optimizing asset maintenance protocols, and more particularly, to systems and methods for optimizing asset maintenance protocols by predicting vegetation-driven outages.

BACKGROUND

Utility poles carrying power lines and pole top devices (e.g., "assets") are ubiquitous in almost every modern city and the surrounding areas. In many such areas, these utility poles stand proximate to vegetation (e.g., trees) that is similar in height to the poles themselves, thereby allowing the vegetation to grow over and/or around the power lines and pole top devices carried on the utility poles. During storms with driving wind and/or heavy rain, or simply as result of other natural consequences (e.g., stacking stressors, termites, etc.), the vegetation near the utility poles can contact and damage the utility poles themselves, the power lines, and/or the pole top devices. Consequently, proximate vegetation is a primary concern of utility companies, as it creates a substantial risk of vegetation-driven outages that can leave thousands without power for extended periods of time.

However, conventional techniques for addressing the issues posed by proximate vegetation to utility poles suffer from several notable drawbacks. Namely, conventional techniques rely on cyclical trimming schedules that completely neglect the true vegetation risk in a particular area, waste trimming time and resources on low-risk areas, do not provide any indication of whether or not such trimming methods produce reliable results, and generally result in vegetation-driven outages in high-risk areas. In particular, proximate vegetation is conventionally trimmed on a cyclical schedule that enables a contractor (or other maintenance personnel) to simply and methodically trim vegetation in a particular region. For example, a typical trimming schedule may instruct a contractor to trim vegetation in a particular region block-by-block proceeding in a linear fashion from north-to-south or east-to-west.

Unfortunately, such a conventional trimming schedule completely ignores the various amounts of risk posed by vegetation in different areas of a particular region. A first portion of the particular region may have very little vegetation requiring less frequent trimming, and a second portion of the particular region may have an excessive amount of vegetation that requires frequent trimming to avoid vegetation-driven outages. Thus, a conventional trimming schedule in such a region would result in an overwhelming amount of vegetation in the second portion, and would likely result in a vegetation-driven outage.

Accordingly, there is a need for systems and methods for optimizing asset maintenance protocols by predicting vegetation-driven outages to provide reduced rates of vegetation-driven outages and to maximize the efficiency and effectiveness of the maintenance personnel performing the asset maintenance.

SUMMARY

Generally, the techniques for optimizing asset maintenance protocols by predicting vegetation-driven outages described herein enable a user to quickly and accurately determine locations where vegetation-driven outages are likely to occur, and to receive optimized asset maintenance protocols in view of the predicted vegetation-driven outages. In particular, the techniques described herein utilize vegetation images and other data in combination with one or more of geospatial analysis algorithm(s), machine learning model(s), and/or linear programming model(s) in order to predict vegetation-driven outages for a designated area. When the techniques of the present disclosure have predicted vegetation-driven outages for the designated area, the techniques of the present disclosure may optimize asset maintenance protocols for assets located within the designated area using an asset maintenance protocol optimization module.

To illustrate, an exemplary application of the present techniques includes determining a failure probability for each asset in a set of assets within a designated area. The assets may include, for example, utility poles carrying power lines and pole top devices (e.g., transformers, cutouts, lightning arrestors, insulators, etc.), such that the failure probability may correspond to a probability that a utility pole, the power lines, and/or the pole top devices are damaged/destroyed by the proximate vegetation. Of course, the assets may include any suitable objects, such as telecommunication lines, railways, etc. The present techniques may also define an asset risk for each asset in the set of assets based on the failure probability, and the asset risk may also incorporate asset data indicating an impact of a respective asset. The present techniques may then cluster vegetation within the designated area to determine regions within the designated area that feature relatively higher risk due to vegetation that could result in a vegetation-driven outage. The present techniques may also optimize a set of asset maintenance protocols corresponding to the set of assets based on the asset risk and the predicted vegetation-driven outage.

As a result of the techniques of the present disclosure, users can alleviate many of the issues associated with conventional techniques. Namely, users may switch from cycle-based maintenance schedules to risk-based maintenance schedules that are informed by the data and analytical models provided herein, and accordingly reduce the incidence rates of vegetation-driven outages, as compared to conventional cycle-based maintenance schedules. The risk-based maintenance schedules of the present disclosure also optimize the impact and efficiency of maintenance entities, as such entities operating in accordance with the risk-based maintenance schedules of the present disclosure maintain assets in a manner that optimally utilizes the services of such entities (e.g., trimming vegetation in accordance with the maintenance schedule). Thus, the risk-based maintenance schedules of the present disclosure also optimize the operational robustness and lifetime of the assets themselves resulting from the optimal maintenance provided by the maintenance entities. Accordingly, the present techniques result in longer asset uptime and overall reliability (e.g., working power lines and pole top devices), maximized time spent maintaining assets in high-risk regions by maintenance personnel, and lower budgetary waste resulting from asset repairs and/or erroneous maintenance costs.

In accordance with the discussions herein, the present disclosure includes improvements to other technologies or technical fields at least because the present disclosure describes or introduces improvements in the field of asset maintenance management. Namely, the geospatial analysis algorithm, machine learning model, linear programming model, and/or the asset maintenance protocol optimization module executing on the server or other computing devices (e.g., user computing device) improves the field of asset maintenance management by introducing the capability to predict vegetation-driven outages and optimize asset maintenance protocols in a manner that was previously unachievable using conventional techniques. This improves over conventional techniques at least because such techniques lack the ability to predict vegetation-driven outages, and are otherwise simply not capable of optimizing asset maintenance protocols to generate a risk-based asset maintenance schedule.

In addition, the present disclosure includes specific features other than what is well-understood, routine, conventional activity in the field, or adding unconventional steps that confine the claim to a particular useful application, e.g., clustering vegetation within the designated area to determine a predicted vegetation-driven outage, among others.

In an embodiment, a computer-implemented method for optimizing asset maintenance protocols by predicting vegetation-driven outages is disclosed. The method comprises determining, by one or more processors, a failure probability for each asset in a set of assets within a designated area to predict a vegetation-driven outage; defining, by the one or more processors, an asset risk for each asset in the set of assets based on the failure probability; clustering, by the one or more processors, vegetation within the designated area based on the asset risk for each asset in the set of assets; and optimizing, by the one or more processors, a set of asset maintenance protocols corresponding to the set of assets based on the clustered vegetation.

In a variation of this embodiment, determining the failure probability further comprises: obtaining, by the one or more processors, a vegetation image representing the designated area; identifying, by the one or more processors, vegetation within the designated area using the vegetation image; obtaining, by the one or more processors, a 3D image including 3D point data representing the vegetation within the designated area; extracting, by the one or more processors, a respective vegetation height for each vegetation represented by the 3D point data; refining, by the one or more processors, a vegetation coverage and a vegetation density based on the respective vegetation height; overlaying, by the one or more processors, the vegetation image with utility lines included in the designated area; and quantifying, by the one or more processors, a respective risk value for each utility line based on the vegetation coverage and the vegetation density. Further in this variation, the method further comprises: displaying, by the one or more processors, the vegetation image with utility lines on a user interface, wherein each utility line includes an indication of the respective risk value. Still further in this variation, the method further comprises: extracting, by the one or more processors executing a geospatial analysis algorithm, the respective vegetation height for each vegetation represented by the 3D point data.

In another variation of this embodiment, the method further comprises: determining, by the one or more processors applying a machine learning (ML) model, the failure probability for each asset in the set of assets within the designated area, wherein the ML model is trained to receive a vegetation coverage value and a vegetation density value as inputs and to output a respective failure probability based on the vegetation coverage value and the vegetation density value.

In yet another variation of this embodiment, the method further comprises: defining, by the one or more processors, the asset risk for each asset in the set of assets based on the failure probability and a respective outage impact value for each asset in the set of assets.

In still another variation of this embodiment, the method further comprises: optimizing, by the one or more processors executing a linear programming model, the set of asset maintenance protocols corresponding to the set of assets based on the clustered vegetation by defining a dynamic trimming cycle for each asset of the set of assets.

In yet another variation of this embodiment, the method further comprises: determining, by one or more processors, the failure probability for each asset in the set of assets within the designated area based on at least one of (i) weather data corresponding to the designated area, (ii) historical outage data corresponding to the designated area, (iii) a vegetation coverage value corresponding to the designated area, (iv) a vegetation density value corresponding to the designated area, (v) pole data corresponding to lines in the designated area, (vi) LIDAR data corresponding to the designated area, and (vii) a trimming history corresponding to the designated area.

In another embodiment, a system for optimizing asset maintenance protocols by predicting vegetation-driven outages is disclosed. The system may include a user interface; a memory storing a set of computer-readable instructions and a set of asset maintenance protocols corresponding to a set of assets; and a processor interfacing with the memory, and configured to execute the set of computer-readable instructions to cause the processor to: determine a failure probability for each asset in the set of assets within a designated area to predict a vegetation-driven outage, define an asset risk for each asset in the set of assets based on the failure probability, cluster vegetation within the designated area based on the asset risk of each asset in the set of assets, and optimize the set of asset maintenance protocols based on the clustered vegetation.

In a variation of this embodiment, the set of computer-readable instructions, when executed, further cause the processor to: obtain a vegetation image representing the designated area; identify vegetation within the designated area using the vegetation image; obtain a 3D image including 3D point data representing the vegetation within the designated area; extract a respective vegetation height for each vegetation represented by the 3D point data; refine a vegetation coverage and a vegetation density based on the respective vegetation height; overlay the vegetation image with utility lines included in the designated area; and quantify a respective risk value for each utility line based on the vegetation coverage and the vegetation density. Further in this variation, the set of computer-readable instructions, when executed, further cause the processor to: display the vegetation image with utility lines on a user interface, wherein each utility line includes an indication of the respective risk value. Yet further in this variation, the set of computer-readable instructions, when executed, further cause the processor to: extract, by executing a geospatial analysis algorithm, the respective vegetation height for each vegetation represented by the 3D point data.

In another variation of this embodiment, the set of computer-readable instructions, when executed, further cause the processor to: determine, by applying a machine learning (ML) model, the failure probability for each asset in the set of assets within the designated area, wherein the ML model is trained to receive a vegetation coverage value and a vegetation density value as inputs and to output a respective failure probability based on the vegetation coverage value and the vegetation density value.

In yet another variation of this embodiment, the set of computer-readable instructions, when executed, further cause the processor to: define the asset risk for each asset in the set of assets based on the failure probability and a respective outage impact value for each asset in the set of assets.

In still another variation of this embodiment, the set of computer-readable instructions, when executed, further cause the processor to: optimize, by executing a linear programming model, the set of asset maintenance protocols corresponding to the set of assets based on the clustered vegetation by defining a dynamic trimming cycle for each asset of the set of assets.

In yet another variation of this embodiment, the set of computer-readable instructions, when executed, further cause the processor to: determine the failure probability for each asset in the set of assets within the designated area based on at least one of (i) weather data corresponding to the designated area, (ii) historical outage data corresponding to the designated area, (iii) a vegetation coverage value corresponding to the designated area, (iv) a vegetation density value corresponding to the designated area, (v) pole data corresponding to lines in the designated area, (vi) LIDAR data corresponding to the designated area, and (vii) a trimming history corresponding to the designated area.

In yet another embodiment, a non-transitory computer-readable storage medium having stored thereon a set of instructions, executable by at least one processor, for optimizing asset maintenance protocols by predicting vegetation-driven outages is disclosed. The instructions may include instructions for determining a failure probability for each asset in a set of assets within a designated area to predict a vegetation-driven outage; instructions for defining an asset risk for each asset in the set of assets based on the failure probability; instructions for clustering vegetation within the designated area based on the asset risk of each asset in the set of assets; and instructions for optimizing a set of asset maintenance protocols corresponding to the set of assets based on the clustered vegetation.

In a variation of this embodiment, the instructions further comprise: instructions for obtaining a vegetation image representing the designated area; instructions for identifying vegetation within the designated area using the vegetation image; instructions for obtaining a 3D image including 3D point data representing the vegetation within the designated area; instructions for extracting a respective vegetation height for each vegetation represented by the 3D point data; instructions for refining a vegetation coverage and a vegetation density based on the respective vegetation height; instructions for overlaying the vegetation image with utility lines included in the designated area; and instructions for quantifying a respective risk value for each utility line based on the vegetation coverage and the vegetation density.

In another variation of this embodiment, the instructions further comprise: instructions for determining, by applying a machine learning (ML) model, the failure probability for each asset in the set of assets within the designated area, wherein the ML model is trained to receive a vegetation coverage value and a vegetation density value as inputs and to output a respective failure probability based on the vegetation coverage value and the vegetation density value.

In yet another variation of this embodiment, the instructions further comprise: instructions for optimizing, by executing a linear programming model, the set of asset maintenance protocols corresponding to the set of assets based on the clustered vegetation by defining a dynamic trimming cycle for each asset of the set of assets.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive and/or limiting.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIGS. 3A-3F are example graphical user interfaces (GUIs) that the example computing environment of FIG. 1 may render for a user to enable review of data related to optimized asset maintenance protocols and/or predicted vegetation-driven outages, in accordance with various embodiments described herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

Figure 1A:
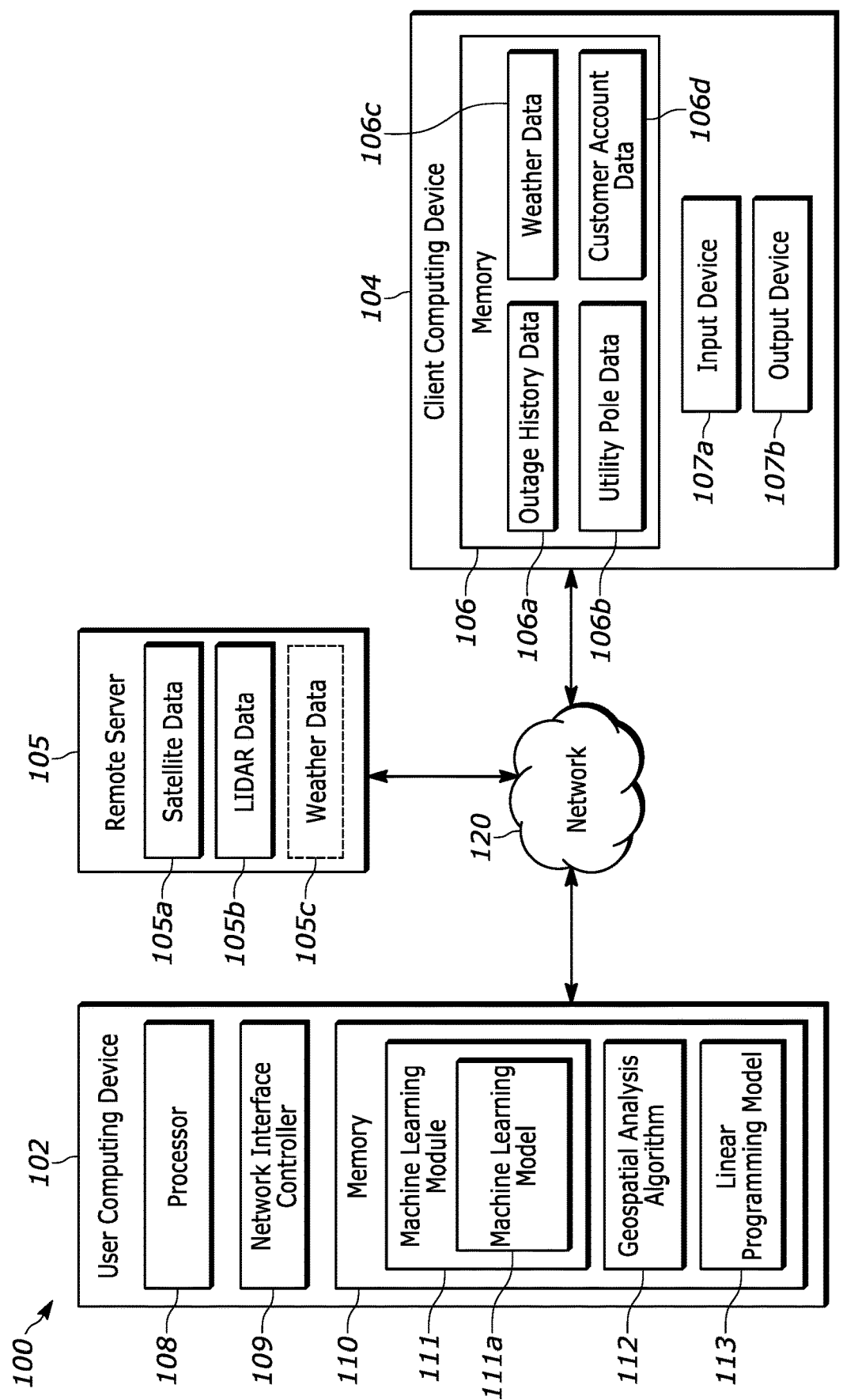
FIG. 1A illustrates an example computing environment for optimizing asset maintenance protocols by predicting vegetation-driven outages, in accordance with various embodiments described herein.

FIG. 1A depicts an example computing environment 100 for optimizing asset maintenance protocols by predicting vegetation-driven outages, in accordance with various embodiments described herein. The computing environment 100 includes a user computing device 102, a client computing device 104, a remote server 105, and a network 120. Some embodiments may include a plurality of user computing devices 102, a plurality of client computing devices 104, and/or a plurality of remote servers 105.

Generally, the client computing device 104 may include a memory 106, an input device 107a, and an output device 107b. The input device 107a may include any suitable device or devices for receiving input, such as one or more microphone, one or more camera, a hardware keyboard, a hardware mouse, a capacitive touch screen, etc. The output device 107b may include any suitable device for conveying output, such as a hardware speaker, a computer monitor, a touch screen, etc. In some cases, the input device 107a and the output device 107b may be integrated into a single device, such as a touch screen device that accepts user input and displays output.

The memory 106 may store outage history data 106a, utility pole data 106b, weather data 106c, and customer account data 106d. Each data set 106a-d may generally include data corresponding to a designated area. As referenced herein, a "designated area" may correspond to an area that is serviced by a particular asset, such as utility poles carrying power lines and pole top devices. These areas may be of any suitable size (e.g., town, regional municipality, city and surrounding suburbs, etc.), and may be subdivided in any manner to achieve predicted vegetation outages and optimized asset maintenance schedules for the subdivided areas, as necessary.

More specifically, the outage history data 106a may include data indicating a history of asset service outages for the designated area. The data included in the outage history data 106a may correspond to the entire designated area, and/or may be subdivided into sets of data indicating histories of asset service outages at respective subdivisions of the designated area. This outage history data 106a may also correspond to one or more assets (e.g., utility poles, water lines, etc.) that provide one or more services (e.g., electrical power, telecom service, running water, etc.) to the designated area. Further, the data indicating the history of asset service outages may correspond to asset service outages of any length (e.g., minutes, hours, days, weeks, etc.) and may include asset service outages extending back any suitable time in the past (e.g., weeks, months, years, etc.).

For example, if a designated area is a small town which receives electrical power through utility poles carrying power lines, the outage history data 106a may include data indicating a history of electrical power outages within the small town. The outage history data 106a for this small town may also indicate the history of electrical power outages that lasted for longer than three days, and that occurred within five years of the current date as a record of any recent, serious electrical power outages. Additionally, or alternatively, the outage history data 106a for this small town may also indicate the history of electrical power outages that lasted for longer than one hour, and that occurred within ten years of the current date to provide a record of how frequently the electrical power within the small town experiences even mild interruptions. In this manner, the outage history data 106a may provide a general indication of historical asset service outages and patterns within a designated area for reference when predicting vegetation-driven outages and optimizing asset maintenance schedules, as described herein.

The utility pole data 106b may include data indicating line section designations for the power lines and pole top devices carried by utility poles located in the designated area. The line section designations may generally divide the assets (e.g., continuous electrical power lines) into sections that each have an associated section designation (e.g., section name, number, etc.). These sections may correspond to, for example, individual blocks within a designated area (e.g., a large metropolitan city), individual neighborhoods within the designated area, and/or any other suitable subdivision of the designated area. Further, the utility pole data 106b may also include data indicating section designations for one or more other assets (e.g., water lines, sewage lines, etc.) that provide one or more services (e.g., running water, sewage transportation, etc.) to the designated area.

For example, if a designated area is a large metropolitan city which receives electrical power through utility poles carrying power lines, the utility pole data 106b may include data indicating line section designations for each power line within the large metropolitan city. The section designations may correspond to groups of 2-3 blocks, such that power lines located within the 2-3 blocks associated with a respective section designation are given the respective section designation as a line section designation. However, in certain neighborhoods of the large metropolitan city where there are more/less houses per block or longer/shorter block lengths, for example, then the section designations may include more/less blocks for each respective section designation, and by extension, more/less power lines for each respective line section designation. In this manner, the utility pole data 106b may provide a general grouping of assets within a designated area for reference when predicting vegetation-driven outages and optimizing asset maintenance schedules, as described herein.

The weather data 106c may include data indicating a history of weather events for the designated area. The data included in the weather data 106c may correspond to the entire designated area, and/or may be subdivided into sets of data indicating histories of weather events at respective subdivisions of the designated area (e.g., for a large rural service area covering a sparsely populated county). This weather data 106c may be subdivided into one or more weather event sections that each correspond to a respective weather event (e.g., rain, thunderstorm, clear, snow, temperatures, etc.) within the designated area. Further, the weather data 106c may correspond to weather events (e.g., heavy rainfall, blizzard, high winds, etc.) of any length (e.g., minutes, hours, days, weeks, etc.) and may include weather events extending back any suitable time in the past (e.g., weeks, months, years, etc.).

For example, if a designated area is a large rural service area which receives telecom service through utility poles carrying telecom lines, the weather data 106c may include data indicating a history of weather events within the large rural service area. The large rural service area may be located in an historically cold region, and the weather data 106c may indicate multiple snowstorms and blizzards within the large rural service area lasting hours/days in the winter months during the past decade, thereby indicating that asset maintenance may be a higher priority during these winter months. However, the weather data 106c may also indicate very mild climate conditions during the late spring through early autumn months for the large rural service area, such that asset maintenance may be a relatively lower priority during the late spring through early autumn months. In this manner, the weather data 106c may provide a general indication of historical weather events/conditions within a designated area for reference when predicting vegetation-driven outages and optimizing asset maintenance schedules, as described herein.

The customer account data 106d may include data representing customer accounts for the asset service within the designated area. The data included in the customer account data 106d may correspond to the entire designated area, and/or may be subdivided into sets of data representing customer accounts for the asset service at respective subdivisions of the designated area. In certain instances, this customer account data 106d may also correspond to one or more asset services (e.g., electrical power, telecom service, running water, etc.) which the respective customer receives within the designated area. Further, the customer account data 106d may correspond to customer accounts that are active and/or inactive, and may generally indicate which asset service to which the customer account corresponds and how long the customer account has received the asset service.

For example, if a designated area is a small town which receives electrical power through utility poles carrying power lines, the customer account data 106d may include data representing customer accounts receiving the electrical power through the power lines within the small town. The customer account data 106d for this small town may also indicate, for example, the average monthly electrical power consumption of each respective customer within the small town. Additionally, or alternatively, the customer account data 106d for this small town may also indicate the average consumption patterns (e.g., midday, late night, etc.) for electrical power by each customer in the small town. In this manner, the customer account data 106d may provide a general indication of asset service consumption patterns for customers within a designated area for reference when predicting vegetation-driven outages and optimizing asset maintenance schedules, as described herein.

The remote server 105 may include satellite data 105a, light detection and ranging (LIDAR) data 105b, and weather data 105c. Generally speaking, the remote server 105 may be a free-source data repository that includes the satellite data 105a, the LIDAR data 105b, and/or the weather data 105c for open access across the network 120. However, in certain aspects, the remote server 105 may be part of the client computing device 104 and/or the user computing device 102. Moreover, the weather data 105c included in the remote server 105 may generally include similar information as the weather data 106c included in the client computing device 104.

In any event, the satellite data 105a and the LIDAR data 105b may generally include image data corresponding to the designated area. The satellite data 105a may include red-green-blue (RGB) images, and/or any other suitable image types, captured by satellites and/or other image capture devices (e.g., drones). These RGB images included in the satellite data 105a may be high resolution images that may include all and/or a portion of the designated area. For example, a designated area may be a large city, and the satellite data 105a may include RGB images featuring individual neighborhoods and/or multiple blocks within the large city. The LIDAR data 105b may include LIDAR images that include depth values corresponding to distances from the LIDAR image capturing device. Generally, the LIDAR data 105b may include LIDAR images that feature similar portions of a designated area as the images included in the satellite data 105a. In this manner, the user computing device 102 and/or other device may readily align the image data from the satellite data 105a and the LIDAR data 105b when predicting vegetation-driven outages and optimizing asset maintenance schedules, as described herein.

The user computing device 102 may include a processor 108, a network interface controller (NIC) 109, and a memory 110. Generally speaking, the user computing device 102 may be an individual computing device, a group of multiple computing devices, an individual server, a group (e.g., cluster) of multiple servers, and/or another suitable type of computing device or system (e.g., a collection of computing resources). In some aspects, one or more components of the user computing device 102 may be embodied by one or more virtual instances (e.g., a cloud-based virtualization service). In such cases, the one or more user computing devices 102 may be included in a remote data center (e.g., a cloud computing environment, a public cloud, a private cloud, etc.).

However, regardless of the specific implementation of the user computing device 102, a user may utilize the user computing device 102 to access the client computing device 104 and the remote server 105 in order to access the data stored therein (e.g., 105a-c, 106a-d). In this manner, the user computing device 102 may retrieve and/or otherwise access the data required to accurately and consistently predict vegetation-driven outages and optimize asset maintenance schedules.

In any event, as previously mentioned, the user computing device 102 includes a processor 108 and an NIC 109. The processor 108 may include any suitable number of processors and/or processor types, such as CPUs and one or more graphics processing units (GPUs). Generally, the processor 108 is configured to execute software instructions stored in memory 110, such as the machine learning module 111, the machine learning model 111a, the geospatial analysis algorithm 112, and/or the linear programming model 113.

The NIC 109 may include any suitable network interface controller(s), such as wired/wireless controllers (e.g., Ethernet controllers), and facilitate bidirectional/multiplexed networking over the network 120 between the user computing device 102 and other components of the environment 100 (e.g., client computing device 104, the remote server 105, etc.).

The memory 110 may include one or more persistent memories (e.g., a hard drive/solid state memory) and stores one or more set of computer executable instructions/modules, including the machine learning module 111, the machine learning model 111a, the geospatial analysis algorithm 112, and the linear programming model 113.

Each of the modules stored in memory 110 implement specific functionality in order to predict vegetation-driven outages and optimize asset maintenance schedules. For example, the machine learning module 111 includes computer-executable instructions for training and operating one or more machine learning model. In general, the machine learning module 111 may train one or more machine learning (ML) models by establishing a network architecture, or topology, and adding layers that may be associated with one or more activation functions (e.g., a rectified linear unit, softmax, etc.), loss functions and/or optimization functions. One or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. Training may be performed by iteratively training the network using labeled training samples.

Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction. In embodiments, a Bayesian model may be used to train the ML model.

In embodiments, the one or more ML models may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

In general, the ML model 111a generated and trained by the ML module 111 may include a decision tree (e.g., a random forest algorithm) that is configured to predict whether or not a particular asset or group of assets will experience a service disruption and/or outage within a particular duration. The ML module 111 may utilize reinforcement learning to train the ML model 111a, and in particular, the ML module 111 may utilize outputs from the decision tree to train the ML model 111a. For example, the ML module 111 may input a set of training features extracted from training vegetation images received from, for example, the satellite data 105a and the LIDAR data 105b into the ML model 111a in order for the ML model 111a to generate a prediction related to whether or not the particular asset or group of assets will experience a service disruption and/or outage within a particular duration (referenced herein as a "failure probability"). The ML module 111 may receive this output from the ML model 111a, and may compare this output to known service disruptions and/or outages corresponding to the assets or group of assets within the particular duration. Based on the differences/similarities between the prediction generated by the ML model 111a and the known service disruptions and/or outages within the particular duration, the ML module 111 may update various weights/parameters of the ML model 111a to more accurately predict asset service disruptions and/or outages during future iterations.

The geospatial analysis algorithm 112 may generally extract data from the LIDAR images included in the LIDAR data 105b. As previously mentioned, the LIDAR images include depth values, and these depth values are a result of the three-dimensional (3D) point data comprising the LIDAR images. The geospatial analysis algorithm 112 may analyze the 3D point data to extract vegetation heights for vegetation represented in the LIDAR images. These vegetation heights may be used by, for example, the machine learning model 111a in order to predict failure probabilities for assets in a designated area.

As an example, the geospatial analysis algorithm 112 may receive a LIDAR image from the LIDAR data 105b, and the algorithm 112 may proceed to analyze the LIDAR image data to extract vegetation heights corresponding to multiple pieces of vegetation featured in the LIDAR image data. More specifically, the geospatial analysis algorithm 112 may analyze the depth values included as part of the LIDAR image data to determine corresponding vegetation height values by comparing (e.g., subtracting), for example, the depth value for a piece of vegetation to the depth value corresponding to a portion of the ground. The depth value for a respective piece of vegetation may be 100 meters, while the depth value for a portion of the ground may be 120 meters. The geospatial analysis algorithm 112 may subtract the depth value for the respective piece of vegetation (100 meters) from the depth value for the portion of the ground (120 meters) to determine a vegetation height of 20 meters for the respective piece of vegetation. Based on this comparison, the geospatial analysis algorithm 112 may determine the height of the piece of vegetation relative to the ground, and may transmit this vegetation height (along with other vegetation heights) to the machine learning model 111a for use as input.

The linear programming model 113 may generally optimize asset maintenance protocols by determining where, when, and how asset maintenance providers should perform maintenance on assets. More specifically, the linear programming model 113 may optimize a set of asset maintenance protocols corresponding to a set of assets based on clustered vegetation by defining a dynamic trimming cycle for each asset of the set of assets. In certain instances, the linear programming model 113 may receive the asset risk for each asset in the designated area, and may proceed to cluster the vegetation in the designated area according to the asset risk. Thereafter, the model 113 may optimize the set of asset maintenance protocols by defining a dynamic trimming cycle that enables the asset maintenance providers to perform asset maintenance in a prioritized, risk-based manner to thereby minimize the occurrence of asset service disruptions and/or outages.

For example, the ML model 111a may return failure probabilities for a first set of assets within a designated area, and the processor 108 may execute the linear programming model 113 and/or other suitable instructions that cause the processor 108 to calculate an asset risk for each asset in the set of assets within the designated area. The asset risk may generally correspond to the probability of failure multiplied by an outage impact value corresponding to the respective asset, which generally corresponds to how impactful damage or destruction of a particular asset is to the overall asset service. A first asset that is more impactful as part of a particular asset service (e.g., a utility pole carrying electrical power to dozens of customers) than a second asset (e.g., a utility pole carrying electrical power to a single customer) may have a relatively higher impact value than the second asset. In this example, the linear programming model 113 may calculate and utilize these asset risks to cluster vegetation into groups that generally correspond to regions designated area ranging from high-risk regions to low-risk regions. When the linear programming model 113 clusters the vegetation into these risk-based groups, the model 113 may proceed to optimize the set of asset maintenance protocols for the set of assets by defining a dynamic trimming cycle that may, for example, indicate that the high-risk regions of the designated area should have the vegetation trimmed on a more frequent schedule than the vegetation of the low-risk regions of the designated area. The linear programming model 113 may also consider asset maintenance provider work schedules and transportation times/costs when generating/defining the dynamic trimming cycle for the designated area.

The network 120 may be a single communication network, or may include multiple communication networks of one or more types (e.g., one or more wired and/or wireless local area networks (LANs), and/or one or more wired and/or wireless wide area networks (WANs) such as the Internet). The network 120 may enable bidirectional communication between the client computing device 104, the user computing device 102, the remote server 105, and/or between multiple client computing devices 104, for example.

Figure 1B:
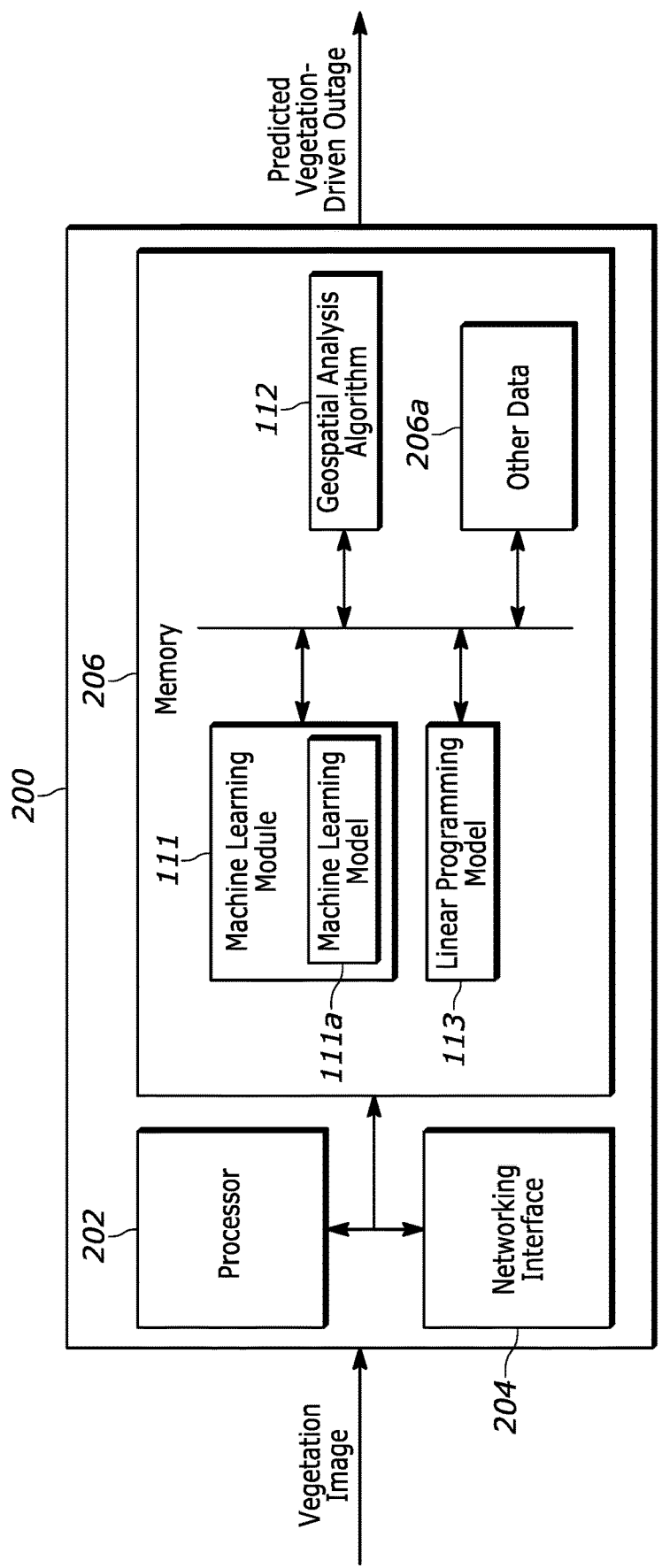
FIG. 1B illustrates an example workflow for predicting vegetation-driven outages utilizing a portion of the example computing environment of FIG. 1, in accordance with various embodiments described herein.

FIG. 1B illustrates an example workflow for predicting vegetation-driven outages utilizing a portion of the example computing environment of FIG. 1, in accordance with various embodiments described herein. In particular, as illustrated in FIG. 1B, the machine learning module 111, the geospatial analysis algorithm 112, and the linear programming model 113 may be hosted and/or otherwise stored on a hosting platform 200 that additionally includes processor(s) 202, a networking interface 204, and one or more memories 206. Further, the one or more memories 206 may store other data 206a that mar include any suitable data, such as formatting data.

The example workflow illustrated in FIG. 1B generally includes the hosting platform 200 receiving a vegetation image as input, and outputting a predicted vegetation-driven outage. More specifically, the vegetation image indicated in FIG. 1B may include an RGB image (e.g., from satellite data 105a) and a LIDAR image (e.g., from LIDAR data 105b) of vegetation within a designated area. When received as input at the hosting platform 200, the geospatial analysis algorithm 112 may analyze/process the vegetation image in order to determine a vegetation height, a vegetation coverage value, and/or a vegetation density value. As previously mentioned, the vegetation height value may generally include the height of each piece of vegetation represented in the vegetation image. The vegetation coverage value may be a numerical value representing an amount or degree of coverage of the assets in the set of assets in the designated area by the vegetation in the vegetation image. For example, the vegetation image may feature a suburban area with a high degree of vegetation coverage near and around the assets, and as a result, the geospatial analysis algorithm 112 may analyze the vegetation image and output a high vegetation coverage value corresponding to the suburban area.

The vegetation density value may be a numerical value representing a density of vegetation in the designated area, and may represent, for example, how many square meters of vegetation canopy is within 15 feet of a utility line (e.g., power line, pole top devices, telecom line, etc.). For example, the vegetation image may feature a rural area with very dense vegetation, and as a result, the geospatial analysis algorithm 112 may analyze the vegetation image and output a high vegetation density value corresponding to the rural area. Regardless, it should be understood that the geospatial analysis algorithm 112 may generate any of the vegetation height, the vegetation coverage value, the vegetation density value, and/or any other suitable metrics or combinations thereof when evaluating the vegetation image(s).

In any event, when the geospatial analysis algorithm 112 has analyzed the vegetation image(s) and generated, for example, the vegetation height, the vegetation coverage value, and/or the vegetation density value, the processor 202 may execute the machine learning model 111a by inputting the vegetation height, the vegetation coverage value, and/or the vegetation density value into the model 111a. The machine learning model 111a may receive the vegetation height, the vegetation coverage value, and/or the vegetation density value, and may output a respective failure probability based on the vegetation coverage value, the vegetation density value, and/or the vegetation height.

The respective failure probability may generally correspond to a probability that a respective asset may fail (e.g., experience a disruption and/or complete failure of asset service) within a certain time period. The respective asset indicated in a respective failure probability may correspond to an asset with a particular segment designation, such as a single set of utility lines (e.g., power lines, pole top devices, telecom lines, etc.). Of course, the respective failure probability may indicate the probability that a group or any suitable number of assets (e.g., power lines, pole top devices, telecom lines, railway lines) may fail within the certain time period, and the certain time period may correspond to any suitable time period, such as hours, days, weeks, months, years, etc.

Using the respective failure probabilities output by the machine learning model 111a, the processor(s) 202 may determine a predicted-vegetation driven outage. For example, the processor(s) 202 may execute instructions included as part of the linear programming model 113, the machine learning module 111, the geospatial analysis algorithm 112, and/or other instructions included in the memory 206 configured to cause the processor(s) 202 to determine a predicted vegetation-driven outage based on whether or not any respective failure probabilities exceed a failure threshold. As an example, a first failure probability for a first asset group may be 70% during a time period, a second failure probability for a second asset group may be 15% during the time period, a third failure probability for a third asset group may be 35% during the time period, and a failure threshold may be 40% during the time period. In this example, the processor(s) 202 may analyze each failure probability and determine that the first group of assets are predicted to fail within the time period (e.g., 75>40), and as a result, the processor(s) 202 may generate a predicted vegetation-driven outage including and/or near the first group of assets.

Additionally, the processor(s) 202 may determine asset risk values as part of the predicted vegetation-driven outage determination to incorporate the outage impact values for each respective asset. Continuing the prior example, the first asset group may have an aggregate outage impact value of 0.5 (from 0 to 1), the second asset group may have an aggregate outage impact value of 0.33 (from 0 to 1), and the third asset group may have an aggregate outage impact value of 0.75 (from 0 to 1). The processor(s) 202 may multiply the aggregate outage impact values with the respective failure probabilities to determine that the first asset group has the highest asset risk value (35%), the third asset group has the second highest asset risk value (30%), and the second asset group has the lowest asset risk value (5%). As a result, the processor(s) 202 may determine that the first asset group should be prioritized first for maintenance, the second asset group should be prioritized second for maintenance, and the third asset group should be prioritized third for maintenance.

Figure 1C:
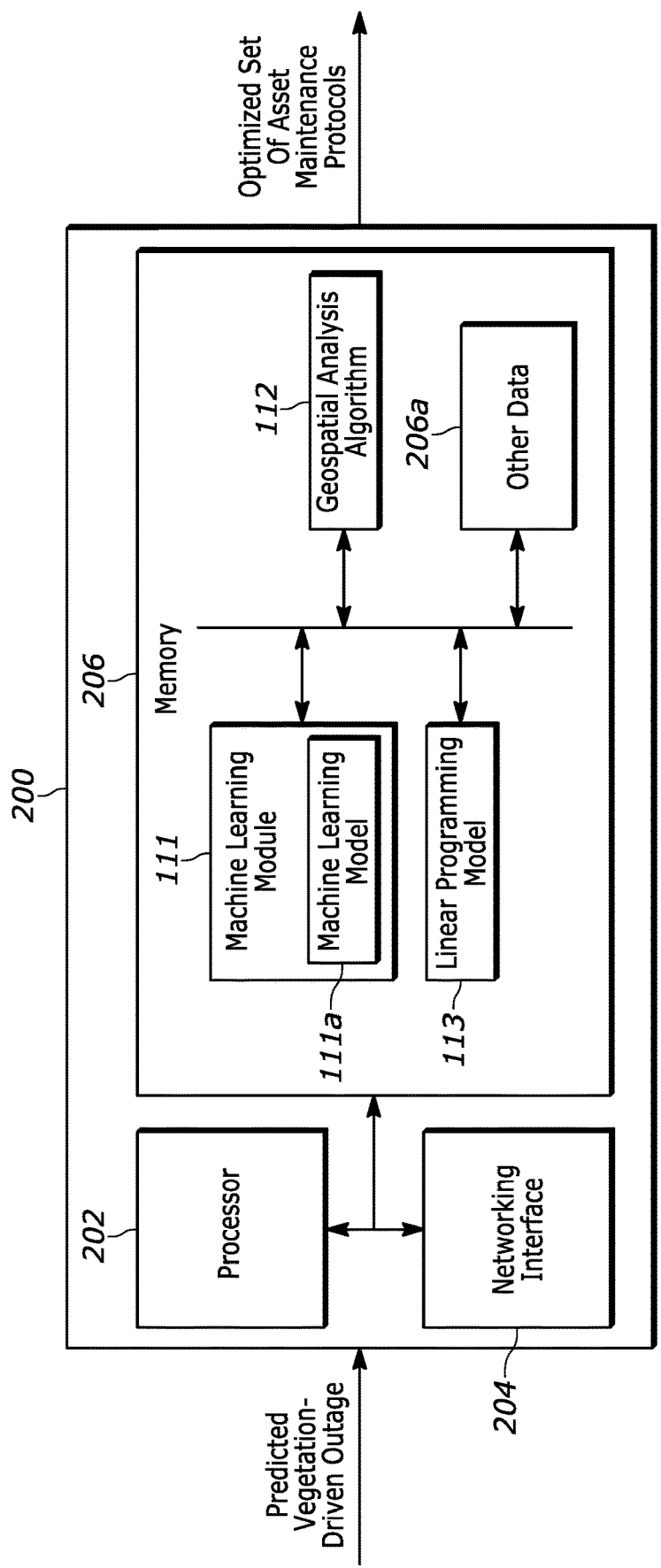
FIG. 1C illustrates an example workflow for optimizing asset maintenance protocols based on vegetation-driven outages utilizing a portion of the example computing environment of FIG. 1, in accordance with various embodiments described herein.

When the processor(s) 202 have determined a predicted vegetation-driven outage, the processor(s) 202 may proceed to execute instructions configured to determine an optimized set of asset maintenance protocols. As illustrated in FIG. 1C, the processor(s) 202 may receive the predicted vegetation-driven outage or outages, and may execute the linear programming model 113 in order to output the optimized set of asset maintenance protocols. Generally speaking, the linear programming model 113 may utilize the asset risk values included in the predicted vegetation-driven outages to characterize asset failures as a mathematical problem for which the model 113 calculates an optimal solution.

In order to optimize the solution and thereby generate the optimized set of asset maintenance protocols, the linear programming model 113, or other suitable instructions stored in memory 206 (e.g., other data 206*a*), may cluster the asset risk values by determining distances between and among assets indicated in asset risk values. Assets with asset risk values that are relatively similar and that are relatively close to one another (e.g., provide asset services to adjacent city blocks) may be clustered together to create larger asset groups that may influence the overall balance of asset risk values of the assets as a result of the asset clustering. Moreover, the linear programming model 113 may also prioritize and/or otherwise consider asset groups that provide asset maintenance providers sufficient maintenance work to justify prioritizing the particular asset group based on asset maintenance costs, minimum volume(s) of work for an asset maintenance provider, and/or the general operational viability of scheduling and/or providing asset maintenance for certain assets and asset groups.

For example, a first asset may have a relatively high asset risk value in the next month, a second asset may have a relatively moderate asset risk value in the next month, a third asset may have a relatively moderate asset risk value in the next month, and a fourth asset may have a relatively moderate asset risk value in the next month. In this example the first asset may not be proximate to any of the second, third, or fourth assets, but each of the second, third, and fourth asset may be very proximate to one another. The linear programming model 113 may cluster the second, third, and fourth assets together to create a first asset group that covers a significantly larger asset service area than the first asset. As a result, the first asset group may have a larger aggregate asset risk value than the first asset, despite the first asset having a higher relative asset risk value than any of the individual assets in the first asset group, and the linear programming model 113 may prioritize the first asset group for maintenance over the first asset to potentially avoid the detrimental impact an outage of the first asset group would have. The aggregate asset risk value may be determined in any suitable manner (e.g., additive sum of each component asset risk value, weighted sum, etc.). In this manner, the linear programming model 113 may generally reduce the overall impact of any vegetation-driven outages by actively considering the aggregate asset risk values of each asset in a cluster/group.

Continuing the prior example, the linear programming model 113 may receive a fifth asset with a relatively low asset risk value that is proximate to the first asset group, and a sixth asset with a relatively moderate asset risk value that is also proximate to the first asset group. Neither the first asset nor the sixth asset may be proximate enough to the first asset group to be included as part of the first asset group (e.g., during clustering), but the linear programming model 113 may optimize the asset maintenance protocols by scheduling asset maintenance providers to provide asset maintenance to the first asset group, the fifth asset, and the sixth asset before the first asset because it is more logistically feasible/efficient for the asset maintenance provider to perform maintenance in that manner than to proceed from the first asset group, the first asset, and then to the fifth and sixth assets. In other words, in this example and in certain instances, the linear programming model 113 may minimize travel and logistical inefficiencies of the asset maintenance providers as part of the optimization process for the asset maintenance protocols. In this manner, the linear programming model 113 may generally reduce the overall number of asset service outages by considering the logistical challenges posed by maintaining assets across broad designated areas of service.

Further, the linear programming model 113 may define an asset maintenance frequency for each asset and group of assets within the designated area based on the asset risk values of each asset and group of assets. The asset maintenance frequency may define how frequently an associate asset may be scheduled for maintenance by an asset maintenance provider. For example, a first asset may require frequent asset maintenance because the proximate vegetation grows quickly and is highly dense, and a second asset may not require very frequent asset maintenance because the proximate vegetation is slow growing and is neither dense nor tall. Thus, the linear programming model 113 may define a more frequent vegetation trimming schedule for the first asset than the second asset.

More generally, the processor(s) 202 may be connected to the one or more memories 206 via a computer bus responsible for transmitting electronic data, data packets, or otherwise electronic signals to and from the processor(s) 202 and the one or more memories 206 in order to implement or perform the machine readable instructions, methods, processes, elements or limitations, as illustrated, depicted, or described for the various flowcharts, illustrations, diagrams, figures, and/or other disclosure herein.

The processor(s) 202 may interface with the one or more memories 206 via the computer bus to execute an operating system (OS). The processor(s) 202 may also interface with the one or more memories 206 via the computer bus to create, read, update, delete, or otherwise access or interact with the data stored in the one or more memories 206. The data stored in the one or more memories 206 may include all or part of any of the data or information described herein, including, for example, the machine learning module 111, the geospatial analysis algorithm 112, the linear programming model 113, other data 206*a*, and/or any other data stored in the one or more memories 206.

The hosting platform 200 may further include a networking interface 204 configured to communicate (e.g., send and receive) data via one or more external/network port(s) to one or more networks or local terminals, such as a computer network and/or user computing devices (e.g., user computing device 102, client computing device 104) described herein. In some embodiments, the hosting platform 200 may include a client-server platform technology such as ASP.NET, Java J2EE, Ruby on Rails, Node.js, a web service or online API, responsive for receiving and responding to electronic requests. The hosting platform 200 may implement the client-server platform technology that may interact, via the computer bus, with the one or more memories 206 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein. According to some embodiments, the hosting platform 200 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network. In some embodiments, the computer network may comprise a private network or local area network (LAN). Additionally, or alternatively, the computer network may comprise a public network such as the Internet.

The hosting platform 200 may further include or implement an operator interface configured to present information to an administrator or operator and/or receive inputs from the administrator or operator. For example, an operator interface may provide a display screen (e.g., via user computing device 102). The hosting platform 200 may also provide I/O components (e.g., ports, capacitive or resistive touch sensitive input panels, keys, buttons, lights, LEDs), which may be directly accessible via or attached to the hosting platform 200 or may be indirectly accessible via or attached to an internal user computing device (e.g., 102*a*). According to some embodiments, an administrator or operator may access the hosting platform 200 by the user computing device 102 to review information (e.g., secure file access), make changes, input secure file share requests, and/or perform other functions.

As described above herein, in some embodiments, the hosting platform 200 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the machine learning module 111, the geospatial analysis algorithm 112, the linear programming model 113, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 202 (e.g., working in connection with the data in the one or more memories 206) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 206 may include one or more forms of non-transitory, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In certain aspects, the one or more memories 206 may store an operating system (OS) (e.g., Microsoft Windows, Linux, Unix, etc.) capable of facilitating the functionalities, applications, methods, or other software as discussed herein.

The one or more memories 206 may also store the machine learning module 111, the geospatial analysis algorithm 112, the linear programming model 113, as well as other data 206*a*, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of the machine learning module 111, the geospatial analysis algorithm 112, and/or the linear programming model 113, where each may be configured to facilitate their various functionalities discussed herein. It should be appreciated that one or more other applications may be envisioned and that are executed by the processor(s) 202.

Figure 2A:
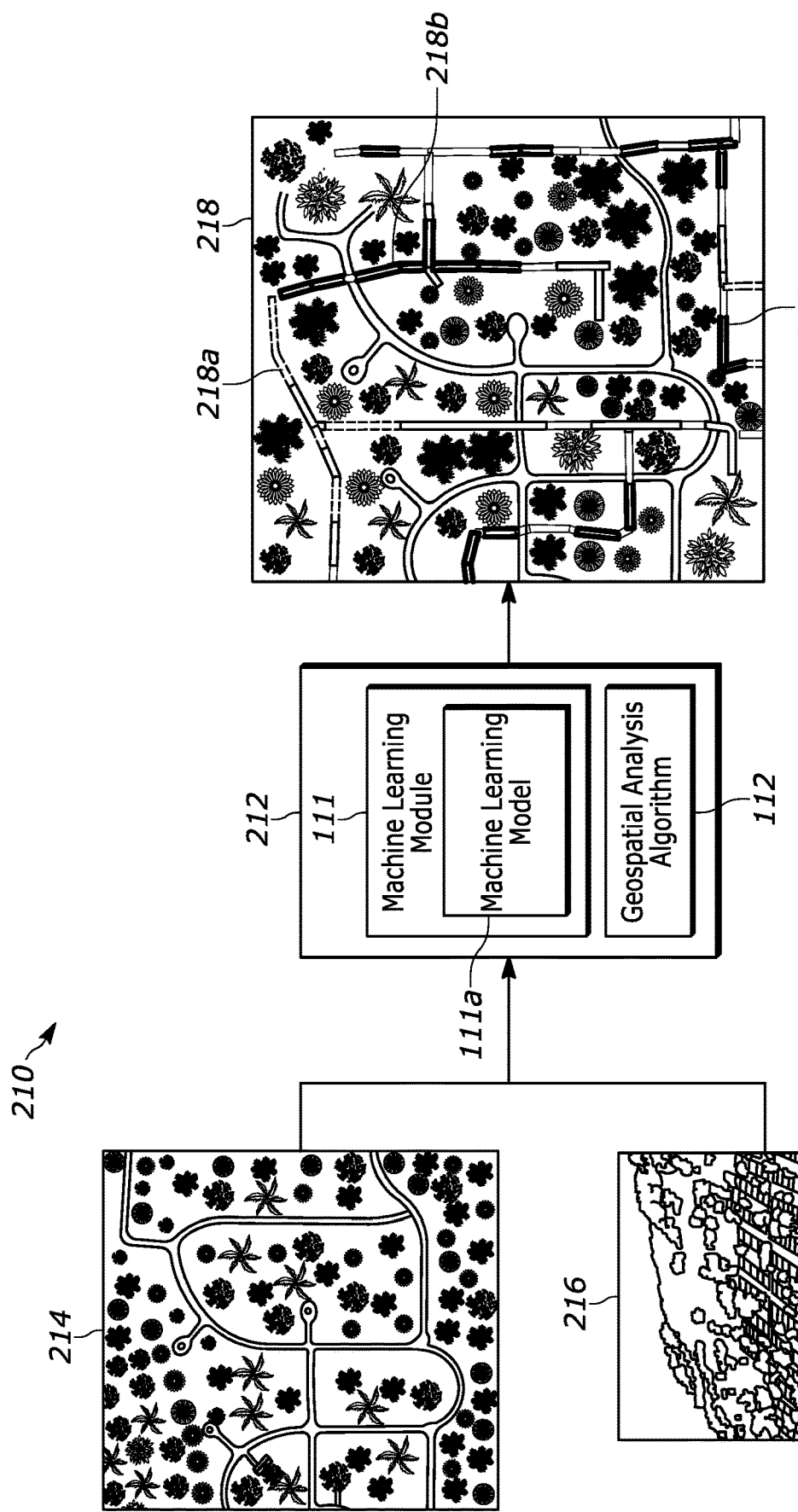
FIG. 2A illustrates components of the example computing environment of FIG. 1 receiving example vegetation images as inputs to generate example overlaid vegetation images.
Figure 2B:
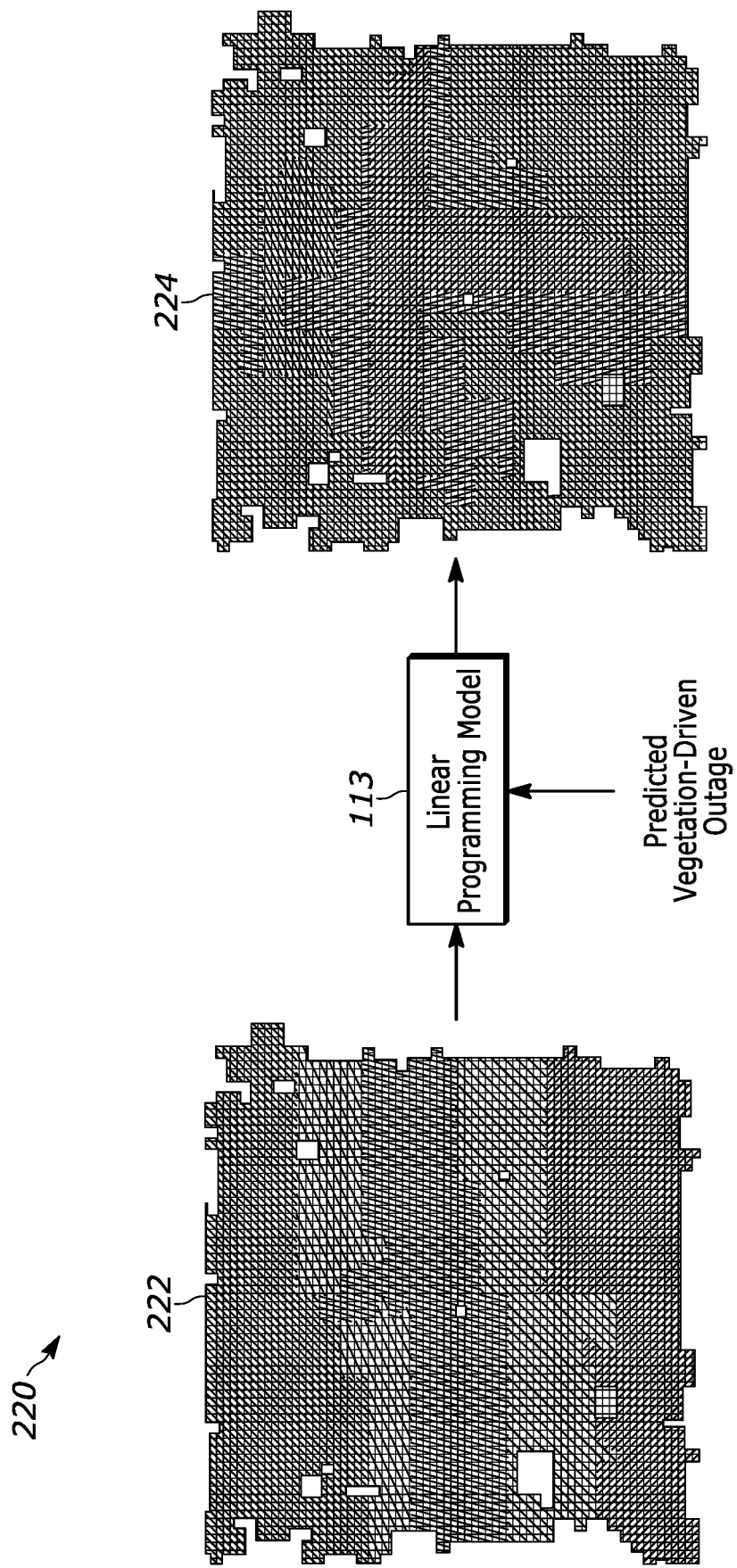
FIG. 2B illustrates components of the example computing environment of FIG. 1 converting an example cycle-based maintenance schedule to an example risk-based maintenance schedule based on predicted vegetation-driven outages.

To provide a better understanding of the functionalities disclosed above regarding the machine learning module 111, the geospatial analysis algorithm 112, and the linear programming model 113, FIGS. 2A and 2B illustrate example inputs and outputs of these components.

Namely, FIG. 2A illustrates components of the example computing environment of FIG. 1 receiving example vegetation images as inputs to generate example overlaid vegetation images.

The example overlaid vegetation image sequence 200 of FIG. 2A includes the machine learning module 111 and the geospatial analysis algorithm 112 (collectively referenced herein as a prediction module 212) receiving a satellite vegetation image 214 and a LIDAR vegetation image 216, and outputting an overlaid vegetation image 218. The satellite vegetation image 214 may include RGB image data representing a designated area, and more specifically, RGB image data representing the vegetation included near and around assets in the designated area. The LIDAR vegetation image 216 may include LIDAR image data representing the designated area, and more specifically, LIDAR image data representing the vegetation included near and around assets in the designated area.

When the prediction module 212 receives the satellite vegetation image 214 and the LIDAR vegetation image 216 as input, the prediction module 212 may proceed to generate asset risk values for assets included in the images 214, 216, as previously described. The prediction module 212 may isolate the assets in the designated area that are featured in the images 214, 216, and may align the assets from the images 214, 216 to determine depth values, height values, density values, etc. correspond to vegetation near/around each of the assets. As a result of these determinations, the prediction module 212 may generate the respective asset risk values based on the nearby vegetation as well as the outage impact value for each respective asset.

When the respective asset risk values are calculated for each asset represented in the images 214, 216, the processors (e.g., processor(s) 202) may generate the overlaid vegetation image 218 that includes asset risk value indicators 218a, 218b, 218c corresponding to the respective risk values of assets represented in the image 218. The asset risk value indicators 218a, 218b, 218c may generally include a patterning (e.g., coloration, brightness, etc.) that indicates a relative asset risk value for the respective asset. For example, the first asset risk value indicator 218a may indicate that the asset overlaid by the indicator 218a has a high asset risk value, the second asset risk value indicator 218b may indicate that the asset overlaid by the indicator 218b has a moderate asset risk value, and the third asset risk value indicator 218c may indicate that the asset overlaid by the indicator 218c has a low asset risk value. As such, the processor(s) 202 may cause a user computing device (e.g., user computing device 102) to render the overlaid vegetation image 218 on a display for viewing by a user to enable the user to view the respective asset risk values in a designated area. However, it should be understood that the overlaid vegetation image 218 is for the purposes of discussion only, and that the processors (e.g., processor(s) 202) may generate any suitable image, combination of images, and/or any other representation to indicate respective asset risk values to a user.

When the prediction module 212 generates the asset risk values, from which a vegetation-driven outage may be predicted, the linear programming model 113 may proceed to optimize the asset maintenance protocols for the assets included in the vegetation images (e.g., 214, 216). FIG. 2B illustrates components of the example computing environment of FIG. 1 converting an example cycle-based maintenance schedule to an example risk-based maintenance schedule based on predicted vegetation-driven outages. Namely, FIG. 2B includes the linear programming model 113 receiving a cycle-based maintenance schedule 222 and a predicted vegetation-driven outage as inputs to output an example risk-based maintenance schedule 224.

Generally speaking, the cycle-based maintenance schedule 222 represents an asset maintenance protocol (e.g., vegetation trimming) that occurs on a cyclical basis without any indication of the risk represented by vegetation present at any particular asset. For example, each block included in the cycle-based maintenance schedule 222 may represent a period of time that has elapsed since a prior asset maintenance. Accordingly, an asset maintenance provider may provide maintenance to the assets represented in the cycle-based maintenance schedule 222 in a row-by-row fashion until each asset in a respective row is maintained before moving to a subsequent row (e.g., a new block, neighborhood, etc.). Such a row-by-row cyclical maintenance pattern may be represented in the cycle-based maintenance schedule 222 by the patternings in the schedule 222 that are generally similar/identical on a row-by-row basis within the schedule 222, as illustrated in FIG. 2B. Namely, each block included in the cycle-based maintenance schedule 222 may have a similar/identical patterning as every other block in the same row, indicating that each asset within the regions represented by the blocks in the row are scheduled for asset maintenance at the same frequency. However, this cycle-based maintenance schedule 222 completely ignores the risk represented by the vegetation near/around the assets in each location within the designated area.

Thus, to resolve this issue, the linear programming model 113 may utilize the predicted vegetation-driven outage to optimize the cycle-based maintenance schedule 222 and generate the risk-based maintenance schedule 224. In particular, the linear programming model 113 may receive the asset risk values generated by the prediction module 212, and may assign maintenance frequencies to assets within the designated area based on these asset risk values. Such a risk-based asset maintenance frequency assignment may be represented by the non-cyclical and/or otherwise disassociated patternings in the risk-based maintenance schedule 224 that are generally independent from one another on a block-by-block basis within the schedule 224, as illustrated in FIG. 2B. Namely, each block included in the risk-based maintenance schedule 224 may not have a similar/identical patterning as every other block in the same row, indicating that the assets within the regions represented by the blocks in a single row may be scheduled for asset maintenance at different frequencies.

For example, the asset risk values received from the prediction module 212 may indicate that a first asset has a high asset risk value, a second asset has a moderate asset risk value, and a third asset has a low asset risk value. In this example, the linear programming model 113 may generate a portion of the risk-based maintenance schedule 224 by calculating a relatively high maintenance frequency for the first asset (e.g., a first patterning), a relatively moderate maintenance frequency for the second asset (e.g., a second patterning that is different from the first patterning), and a relatively low maintenance frequency for the third asset (e.g., a third patterning that is different from the first patterning and the second patterning).

More generally, the linear programming model 113 may analyze all asset risk values output by the prediction module 212 to determine the risk-based maintenance schedule which includes a maintenance prioritization and maintenance frequency for each asset within the designated area. The maintenance prioritization may indicate when each asset is currently scheduled for maintenance, and the maintenance frequency may indicate how frequently each asset is to be maintained in the future. For example, a first asset may have a high asset risk value and may have been recently maintained, and a second asset may have a moderate asset risk value but has not been maintained recently. In this example, the first asset may have a more frequent maintenance frequency than the second asset, but the second asset may have a higher priority on the maintenance prioritization because the first asset was recently maintained and the second asset has not been maintained recently. Of course, the maintenance prioritization and the maintenance frequency may also be impacted by the logistical considerations described herein, such as asset maintenance costs, minimum volume(s) of work for an asset maintenance provider, and/or the general operational viability of scheduling and/or providing asset maintenance for certain assets and asset groups.

In certain embodiments, the linear programming model 113 and/or other suitable instructions (e.g., the machine learning model 111a) may further optimize the risk-based maintenance schedules based on a date/time when the vegetation proximate to an asset was last trimmed. In particular, the instructions executed by the processor(s) (e.g., processor(s) 202) may plot and/or otherwise analyze the dates/times when each designated area is scheduled to be maintained/trimmed, and the instructions may then cause the processor(s) 202 to apply a smoothing function to the aggregate asset maintenance schedule represented by the aggregated maintenance protocols for the assets over the course of a calendar year and/or any other suitable timeframe or combinations thereof.

In other words, the processor(s) 202 may execute instructions stored in memory (e.g., linear programming model 113, machine learning model 111*a*, geospatial analysis algorithm 112, etc.) that cause the processor(s) 202 to smooth/normalize a workload represented by the asset maintenance protocols across a full year (or other suitable timeframe) to ensure, inter alia, that asset maintenance fluctuations throughout the year are minimal. For example, the processor(s) 202 may perform this smoothing/normalization by plotting parameters such as the dynamic trimming cycle assignments for particular designated areas as a function of time, and adjusting the dynamic trimming cycle assignments as necessary to create a relatively even distribution of asset maintenance (e.g., trimming) across a year or other suitable timeframe. In this manner, the systems of the present disclosure may optimally determine how the workload represented by the asset maintenance protocols should be distributed among/between different service centers and handled throughout the year without encountering severe lulls/peaks of required maintenance/trimming.

To illustrate, the processor(s) 202 may receive a predicted vegetation-driven outage within a large region that has various assets surrounded and/or otherwise proximate to vegetation of various heights/densities/etc. The processor(s) 202 may analyze the predicted vegetation-driven outage (e.g., via the linear programming model 113, machine learning model 111*a*, geospatial analysis algorithm 112, etc.) and may generate a set of asset maintenance protocols corresponding to the various assets implicated as part of the predicted vegetation-driven outage. In this example, the set of asset maintenance protocols may indicate that a substantial percentage of the assets within the designated area (e.g., 30% or more) may require maintenance/trimming during a relatively short time period (e.g., one month). The processor(s) 202 may then smooth/normalize this set of asset maintenance protocols to shift some of these maintenance/trimming schedules to different periods of a working year where there is significantly less maintenance/trimming scheduled. As a result, the processor(s) 202 may output the set of optimize asset maintenance protocols that include these smoothed/normalized maintenance/trimming schedules to create an optimal workflow for the maintenance/trimming personnel.

In some embodiments, the linear programming model 113 and/or other suitable instructions may cluster the designated areas based on similarities in their corresponding dynamic trimming cycles. The linear programming model 113 may utilize geospatial analysis to cluster, bundle, and/or otherwise associate designated areas that share trimming/maintenance year recommendations included as part of the dynamic trimming cycles. The linear programming model 113 may also impose and/or otherwise utilize bounds regarding how small/large each cluster of designated areas may be, how many year differences in the dynamic trimming cycles the designated areas may have, and/or any other suitable constraints or combinations thereof.

In particular, the bounds imposed by the linear programming model 113 may prevent and/or incentivize certain clusterings of otherwise disparate designated areas. For example, the linear programming model 113 and/or other suitable instructions may incorporate and/or otherwise utilize certain thresholds to prevent clustering of as first designated area with a second, infinitesimally small designated area and/or assets therein. The linear programming model 113 may determine that the second designated area is small enough that causing maintenance/trimming personnel to travel to the second designated area and the first designated area in a same day/week/etc. does not provide a sufficient benefit to the assets present in the second designated area to offset the time and other resources expended to travel from the first designated area to the second designated area. In this manner, the linear programming model 113 may avoid wasting trimming/maintenance personnel resources to travel and perform trimming/maintenance on the second designated area despite the first and second designated areas having highly similar trimming/maintenance schedules. Accordingly, in these embodiments, the systems of the present disclosure may further refine the determination/designation of dynamic trimming cycles using these geospatially clustered groups of designated areas.

In certain embodiments, the linear programming model 113 and/or other suitable instructions may additionally output risk-based maintenance schedules that include and/or are based on growth values of the vegetation in a particular designated area. Namely, the linear programming model 113 and/or other suitable instructions may incorporate species data of vegetation identified and/or otherwise indicated in the outputs of the prediction module 212 to determine, and ultimately classify, if a designated area is a fast growth area, a slow growth area, and/or any other suitable type of growth area or combinations thereof. The linear programming model 113 may incorporate this growth type classification for each designated area into the resulting risk-based maintenance schedules, and may thereby achieve more efficient trimming and maintenance by considering the growth rates of vegetation in the respective designated areas.

In some embodiments, the linear programming model 113 and/or other suitable instructions may additionally output risk-based maintenance schedules that include and/or are based on a cost associated with trimming individual vegetation in a particular designated area. Namely, the linear programming model 113 and/or other suitable instructions may additionally be configured to predict the cost (e.g., personnel time, travel, etc.) associated with trimming/maintaining individual vegetation identified and/or otherwise indicated in the outputs of the prediction module 212. The linear programming model 113 may then calculate the number or total amount of vegetation within a particular designated area to determine a total cost corresponding to trimming/maintaining the designated area.

Afterwards, the linear programming model 113 may incorporate this total cost for each designated area into the resulting risk-based maintenance schedules to distribute the total cost in any suitable manner. For example, the linear programming model 113 may be configured to generate risk-based maintenance schedules that evenly (or as evenly as possible) distribute the cost throughout a particular work period (e.g., a year). In this manner, the systems of the present disclosure may achieve more efficient, cost-effective trimming and maintenance by considering the cost of trimming individual vegetation in the respective designated areas.

Further, in certain embodiments, the linear programming model 113 and/or other suitable instructions may additionally output risk-based maintenance schedules that include and/or are based on a cost associated with deferring trimming/maintenance for particular designated areas. Namely, the linear programming model 113 and/or other suitable instructions may additionally be configured to predict the cost (e.g., personnel time, travel, etc.) associated with deferring trimming/maintaining particular vegetation identified and/or otherwise indicated in the outputs of the prediction module 212 based on species data of the vegetation, as described herein. For example, the linear programming model 113 may classify each designated area as a fast/medium/slow/etc. growth rate area, and may then determine a total deferral cost corresponding to deferring trimming/maintaining the designated area. The total deferral cost may include, for instance, an expected amount that the resulting trimming/maintaining the designated area may increase by the next scheduled maintenance/trimming period.

Afterwards, the linear programming model 113 may incorporate this total deferral cost for each designated area into the resulting risk-based maintenance schedules to distribute the total cost and/or workload in any suitable manner. For example, the linear programming model 113 may be configured to generate risk-based maintenance schedules that evenly (or as evenly as possible) distribute the cost and/or workloads throughout a particular work period (e.g., a year). However, in certain instances, the linear programming model 113 may prioritize certain designated areas for more regular trimming/maintenance than other designated areas because the total deferral cost for the certain designated areas is significantly larger than the total deferral cost of the other designated areas. In this manner, the systems of the present disclosure may achieve more efficient, cost-effective trimming and maintenance by considering the cost of deferring trimming vegetation in respective designated areas.

The user interfaces of FIGS. 3A-3F illustrate graphical user interfaces (GUIs) displaying information related to the systems, methods, and techniques described herein. More specifically, 3A-3F are example GUIs that the example computing environment of FIG. 1 may render for a user to enable review of data related to optimized asset maintenance protocols and/or predicted vegetation-driven outages, in accordance with various embodiments described herein. For example, each of the GUIs may be generated and/or rendered by any of the user computing device 102, the client computing device 104, the remote server 105, the hosting platform 200, and/or any other component described herein.

Figure 3A:
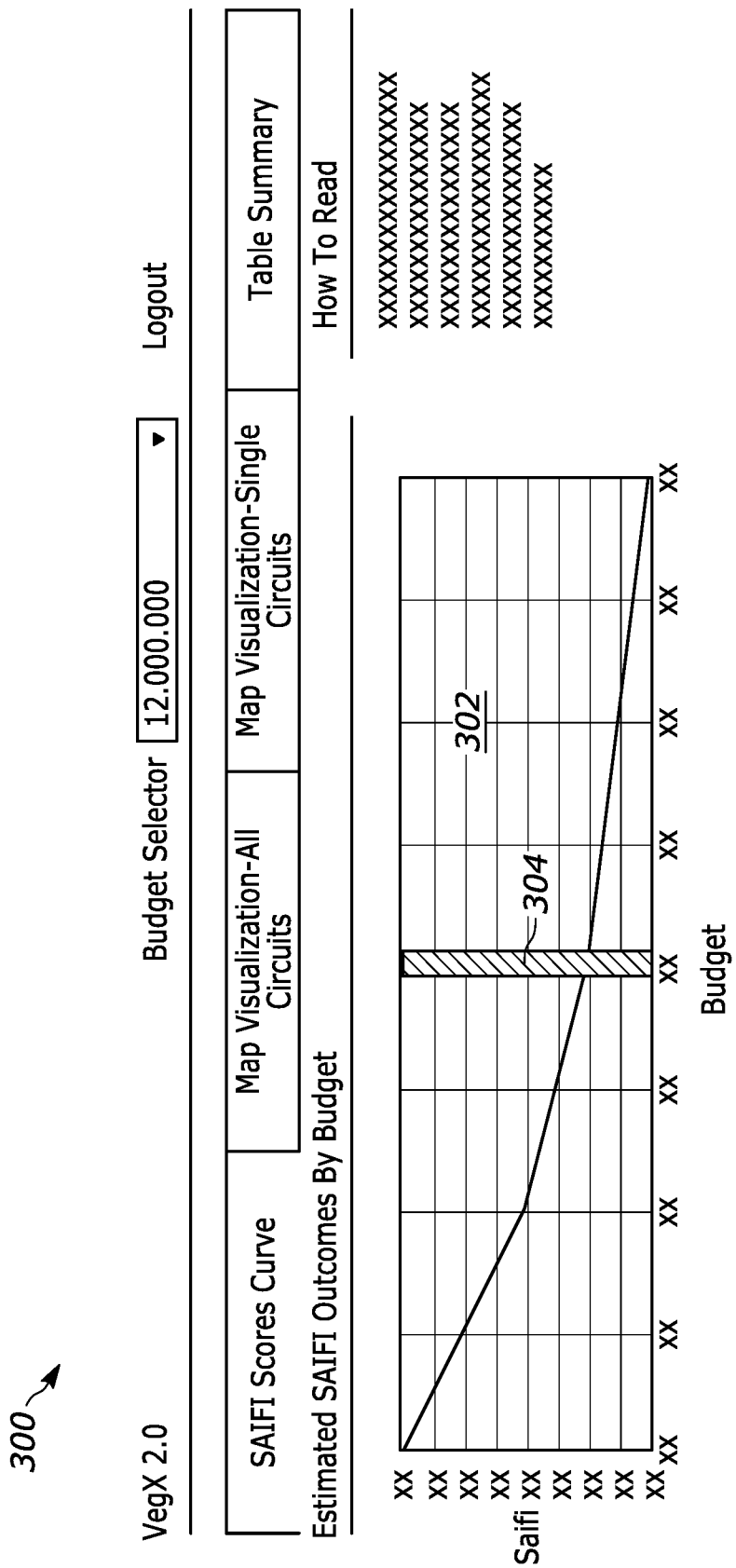
Figure 3B:
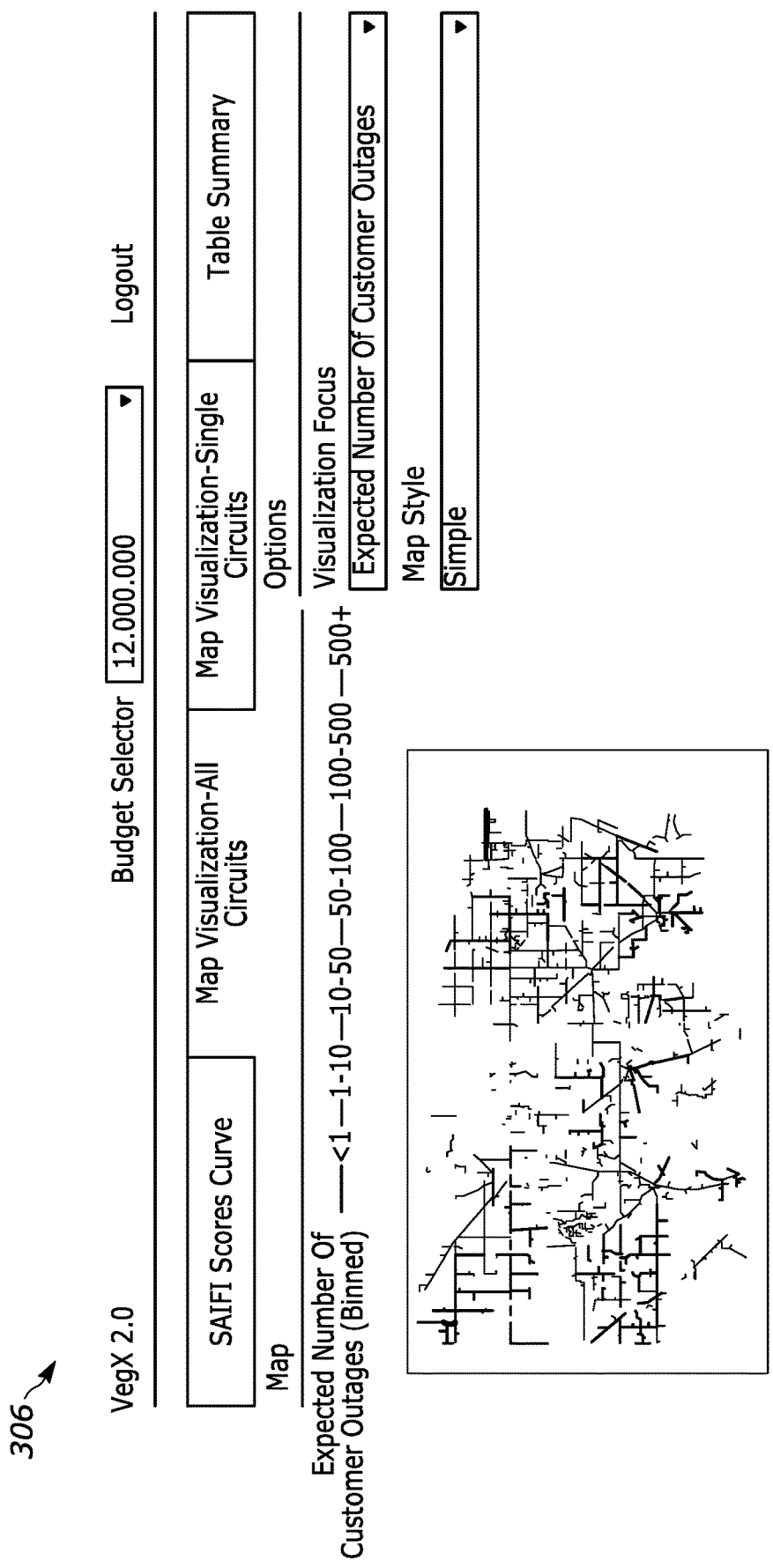

FIG. 3A generally illustrates a GUI 300 that is configured to enable an internal user to view a predicted system average interruption frequency index (SAIFI) based on a budget allocated for asset maintenance and the asset risk values for assets in the designated area. In particular, the GUI 300 includes a graph 302 that represents a set of possible expected SAIFI outcomes based on the set of optimized asset maintenance protocols output by the linear programming model 113 as a function of asset maintenance budget. The region 304 highlights a currently selected budget (e.g., selected by a user), and represents the SAIFI for interruptions the user may expect within the designated area at the currently selected budget appropriated for asset maintenance within the designated area. Of particular note, the lower budgets (e.g., on the left-hand side of the graph 302) may not always have corresponding SAIFI estimations because the linear programming model 113 may be unable to output a viable maintenance schedule for all assets in the designated area that meet the lower budgets.

Thus, the computing device may proceed to generate subsequent GUIs to show the user additional information related to the asset maintenance protocols output by the linear programming model 113 based on the currently selected budget. For example, FIG. 3B generally illustrates a GUI 306 displaying an expected number of outages for each asset within the designated area. The GUI 306 may be color coded and/or include any suitable patterning sufficient to indicate different gradations of expected outages for each asset within the designated area. Moreover, within this GUI 306, the user may select various options to change/alter the view of the map to include different representations of the designated area, such as a satellite view (e.g., similar to the overlaid vegetation image 218), a LIDAR view, and/or any other suitable visual representation of the designated area.

Figure 3C:
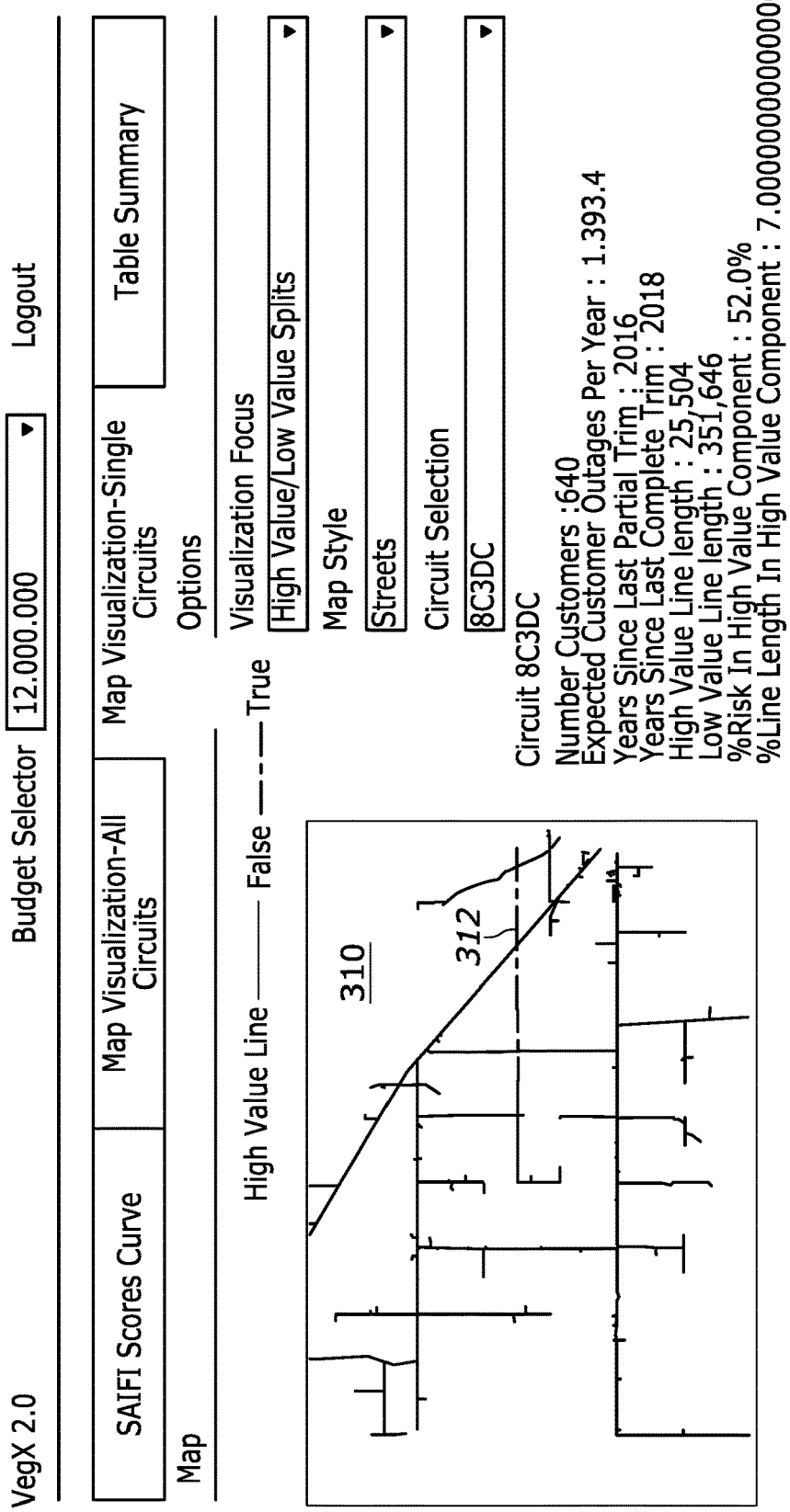

FIG. 3C generally illustrates a GUI 308 displaying a portion of the designated area, and asset-specific information within the portion of the designated area. A user may select a specific asset 310 within the portion of the designated area, and the GUI 308 may display information about the specific asset 310, such as a number of serviced customers, an expected number of asset service outages per year, a number of years/months/etc. since a prior partial/full maintenance (e.g., vegetation trimming), an amount of high/low-value assets, a risk percentage of the high-value assets, and a percentage of the assets that are high-value. The high/low-value assets may be designated as such based on, for example, their respective outage impact values, and/or any other suitable criteria. The high-value assets (e.g., high-value asset 312) may also be delineated from the low-value assets in the GUI 308 based on color coding and/or include any suitable patterning sufficient to indicate the different value assets within the portion of the designated area. Moreover, within this GUI 308, the user may select various options to change/alter the view of the map to include different representations of the portion of the designated area, such as a satellite view (e.g., similar to the overlaid vegetation image 218), a LIDAR view, and/or any other suitable visual representation of the portion of the designated area.

FIG. 3D generally illustrates a GUI 314 featuring a table summary of the information generated by the linear programming model 113 related to each asset and/or group of assets within the designated area for review by a user. The GUI 314 may include any suitable information related to the assets within the designated area, such as a likelihood of outage, a number of years since a prior full/partial maintenance (e.g., vegetation trimming), a total number of customers serviced by an asset/asset group, a total number of expected outages, a total length of the asset, an asset maintenance recommendation over a specified duration (e.g., current year, subsequent year(s)), and/or any other suitable information or combinations thereof.

Figure 3E:
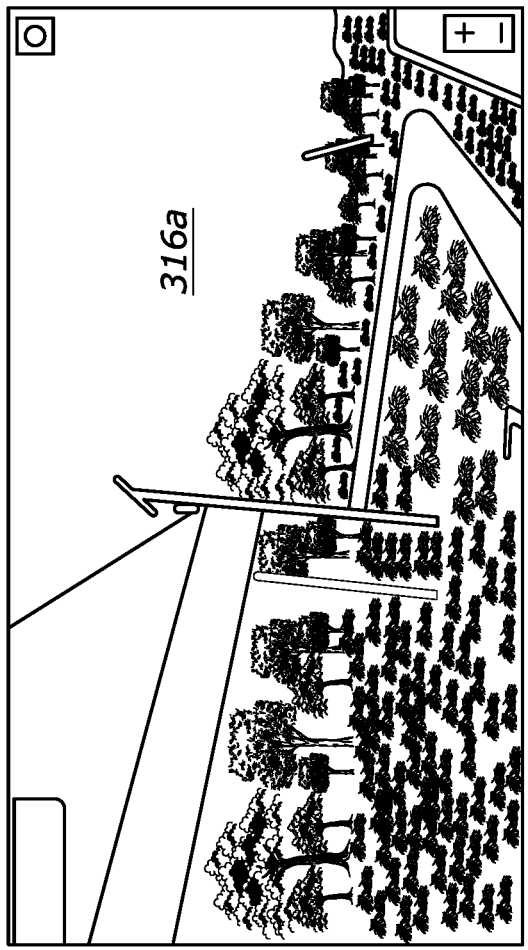
Figure 3E:
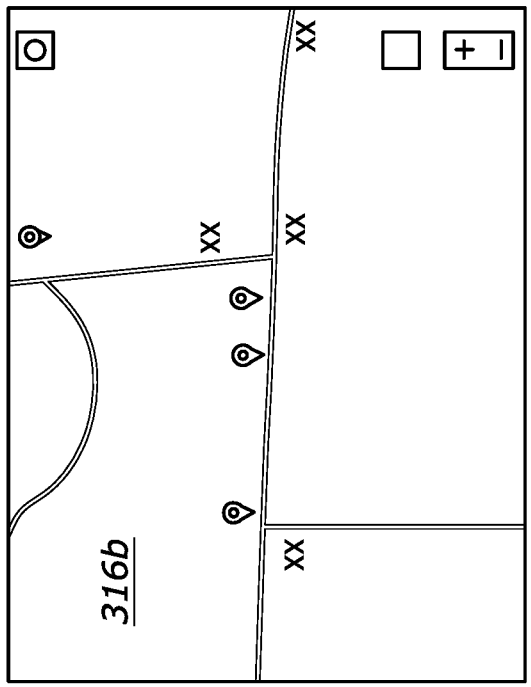

FIG. 3E generally illustrates a GUI 316 featuring an asset location preview 316a and an asset location map view 316b to enable a user to view any asset and the surrounding location within the designated area. The asset location preview 316a may include a RGB image of a selected asset, as captured by an imaging device nearby the selected asset. For example, the user may select an area on the asset location map view 316b to view, and the computing device may retrieve an image corresponding to the user's chosen location on the map view 316b and render the image within the asset location preview 316a. In this manner, the user may view assets and the surrounding area within the designated area without physically travelling to the location of the assets.

FIG. 3F generally illustrates a GUI 318 featuring a virtual three-dimensional (3D) view of assets within the designated area for review by a user. In particular, a computing device (e.g., user computing device 102) may include a combination of LIDAR image data and asset location data to render the 3D view included in the GUI 318. This 3D view may enable a user to quickly and easily plan work with asset maintenance providers, such that the maintenance provided by the asset maintenance providers is more efficient and safe. For example, the 3D view may enable users to more accurately plan how to perform such asset maintenance in a manner that reduces truck rolling during maintenance, and can more accurately locate encroaching vegetation for more precise asset maintenance (e.g., vegetation trimming).

Figure 4:
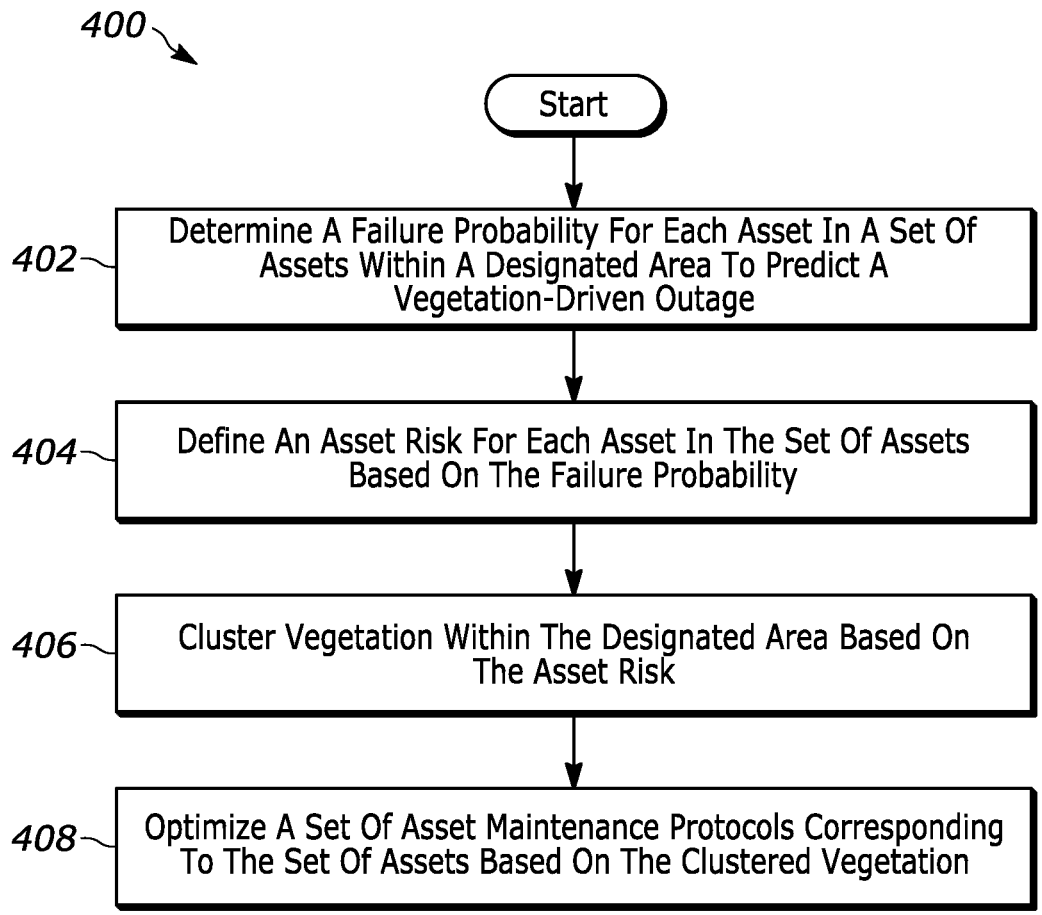
FIG. 4 illustrates an example method for optimizing asset maintenance protocols by predicting vegetation-driven outages, in accordance with various embodiments described herein.

FIG. 4 illustrates an example method 400 for optimizing asset maintenance protocols by predicting vegetation-driven outages, in accordance with various embodiments described herein. At least portions of the method 400 may be performed by one or more processors (e.g., processor(s) 202) utilizing the embodiments of the user computing device 102, the client computing device 104, and/or the remote server 105 of FIG. 1, for example, or by other suitable modules or systems. In embodiments, the method 400 may include additional or alternate steps other than those described herein.

The method 400 may include determining, by one or more processors, a failure probability for each asset in a set of assets within a designated area to predict a vegetation-driven outage (block 402). In certain aspects, the method 400 may further include obtaining, by the one or more processors, a vegetation image (e.g., vegetation image 214) representing the designated area; identifying, by the one or more processors, vegetation within the designated area using the vegetation image; obtaining, by the one or more processors, a 3D image (e.g., LIDAR image 216) including 3D point data representing the vegetation within the designated area; extracting, by the one or more processors, a respective vegetation height for each vegetation represented by the 3D point data; refining, by the one or more processors, a vegetation coverage and a vegetation density based on the respective vegetation height; overlaying, by the one or more processors, the vegetation image with utility lines included in the designated area; and quantifying, by the one or more processors, a respective risk value for each utility line based on the vegetation coverage and the vegetation density.

Further in these aspects, the method 400 may include displaying, by the one or more processors, the vegetation image with utility lines on a user interface, wherein each utility line includes an indication of the respective risk value. Each of the utility lines may include power lines, pole top devices, telecom lines, and/or any other suitable lines or objects that provide a service. Moreover, the method 400 may include extracting, by the one or more processors executing a geospatial analysis algorithm (e.g., geospatial analysis algorithm 112), the respective vegetation height for each vegetation represented by the 3D point data.

In some aspects, the method 400 may also include determining, by the one or more processors applying a machine learning (ML) model (e.g., ML model 111a), the failure probability for each asset in the set of assets within the designated area. The ML model may generally be trained to receive a vegetation coverage value and a vegetation density value as inputs and to output a respective failure probability based on the vegetation coverage value and the vegetation density value.

In certain aspects, the method 400 may further include determining, by one or more processors, the failure probability for each asset in the set of assets within the designated area based on at least one of (i) weather data corresponding to the designated area, (ii) historical outage data corresponding to the designated area, (iii) a vegetation coverage value corresponding to the designated area, (iv) a vegetation density value corresponding to the designated area, (v) pole data corresponding to lines in the designated area, (vi) LIDAR data corresponding to the designated area, and/or (vii) a trimming history corresponding to the designated area.

The method 400 may further include defining, by the one or more processors, an asset risk for each asset in the set of assets based on the failure probability (block 404). In certain aspects, the method 400 may also include defining, by the one or more processors, the asset risk for each asset in the set of assets based on the failure probability and a respective outage impact value for each asset in the set of assets.

The method 400 may also include clustering, by the one or more processors, vegetation within the designated area based on the asset risk for each asset in the set of assets (block 406). When the processors cluster the vegetation within the designated area, the method 400 may also include optimizing, by the one or more processors, a set of asset maintenance protocols corresponding to the set of assets based on the clustered vegetation (block 408). Namely, in some aspects, the method 400 may include optimizing, by the one or more processors executing a linear programming model (e.g., linear programming model 113), the set of asset maintenance protocols corresponding to the set of assets based on the clustered vegetation by defining a dynamic trimming cycle for each asset of the set of assets.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although user operations of one or more methods are illustrated and described as separate operations, one or more of the user operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited.

The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for optimizing asset maintenance protocols by predicting vegetation-driven outages, the method comprising:
    determining, by one or more processors, a failure probability for each asset in a set of assets within a designated area based on a vegetation coverage value and a vegetation density value determined from a 3D image of the designated area to predict a vegetation-driven outage;
    defining, by the one or more processors, an asset risk for each asset in the set of assets based on the failure probability;
    clustering, by the one or more processors, vegetation within the designated area based on the asset risk for each asset in the set of assets; and
    optimizing, by the one or more processors, a set of asset maintenance protocols corresponding to the set of assets based on the clustered vegetation.

2. The method of claim 1, wherein determining the failure probability further comprises:
    obtaining, by the one or more processors, a vegetation image representing the designated area;
    identifying, by the one or more processors, vegetation within the designated area using the vegetation image;
    obtaining, by the one or more processors, a 3D image including 3D point data representing the vegetation within the designated area;
    extracting, by the one or more processors, a respective vegetation height for each vegetation represented by the 3D point data;
    determining, by the one or more processors, the vegetation coverage value and the vegetation density value based on the respective vegetation height;
    overlaying, by the one or more processors, the vegetation image with utility lines included in the designated area; and
    quantifying, by the one or more processors, a respective risk value for each utility line based on the vegetation coverage value and the vegetation density value.

3. The method of claim 2, further comprising:
    displaying, by the one or more processors, the vegetation image with utility lines on a user interface, wherein each utility line includes an indication of the respective risk value.

4. The method of claim 2, further comprising:
    extracting, by the one or more processors executing a geospatial analysis algorithm, the respective vegetation height for each vegetation represented by the 3D point data.

5. The method of claim 1, further comprising:
determining, by the one or more processors applying a machine learning (ML) model, the failure probability for each asset in the set of assets within the designated area, wherein the ML model is trained to receive a respective vegetation coverage value and a respective vegetation density value as inputs and to output a respective failure probability based on the respective vegetation coverage value and the respective vegetation density value.

6. The method of claim 1, further comprising:
defining, by the one or more processors, the asset risk for each asset in the set of assets based on the failure probability and a respective outage impact value for each asset in the set of assets.

7. The method of claim 1, further comprising:
optimizing, by the one or more processors executing a linear programming model, the set of asset maintenance protocols corresponding to the set of assets based on the clustered vegetation by defining a dynamic trimming cycle for each asset of the set of assets.

8. The method of claim 1, further comprising:
determining, by one or more processors, the failure probability for each asset in the set of assets within the designated area based on at least one of (i) weather data corresponding to the designated area, (ii) historical outage data corresponding to the designated area, (iii) pole data corresponding to lines in the designated area, (iv) LIDAR data corresponding to the designated area, and (v) a trimming history corresponding to the designated area.

9. A system for optimizing asset maintenance protocols by predicting vegetation-driven outages, the system comprising:
a user interface;
a memory storing a set of computer-readable instructions and a set of asset maintenance protocols corresponding to a set of assets; and
a processor interfacing with the memory, and configured to execute the set of computer-readable instructions to cause the processor to:
determine a failure probability for each asset in the set of assets within a designated area based on a vegetation coverage value and a vegetation density value determined from a 3D image of the designated area to predict a vegetation-driven outage,
define an asset risk for each asset in the set of assets based on the failure probability,
cluster vegetation within the designated area based on the asset risk for each asset in the set of assets, and
optimize the set of asset maintenance protocols based on the clustered vegetation.

10. The system of claim 9, wherein the set of computer-readable instructions, when executed, further cause the processor to:
obtain a vegetation image representing the designated area;
identify vegetation within the designated area using the vegetation image;
obtain a 3D image including 3D point data representing the vegetation within the designated area;
extract a respective vegetation height for each vegetation represented by the 3D point data;
determine the vegetation coverage value and the vegetation density value based on the respective vegetation height;
overlay the vegetation image with utility lines included in the designated area; and
quantify a respective risk value for each utility line based on the vegetation coverage value and the vegetation density value.

11. The system of claim 10, wherein the set of computer-readable instructions, when executed, further cause the processor to:
display the vegetation image with utility lines on a user interface, wherein each utility line includes an indication of the respective risk value.

12. The system of claim 10, wherein the set of computer-readable instructions, when executed, further cause the processor to:
extract, by executing a geospatial analysis algorithm, the respective vegetation height for each vegetation represented by the 3D point data.

13. The system of claim 9, wherein the set of computer-readable instructions, when executed, further cause the processor to:
determine, by applying a machine learning (ML) model, the failure probability for each asset in the set of assets within the designated area, wherein the ML model is trained to receive a respective vegetation coverage value and a respective vegetation density value as inputs and to output a respective failure probability based on the respective vegetation coverage value and the respective vegetation density value.

14. The system of claim 9, wherein the set of computer-readable instructions, when executed, further cause the processor to:
define the asset risk for each asset in the set of assets based on the failure probability and a respective outage impact value for each asset in the set of assets.

15. The system of claim 9, wherein the set of computer-readable instructions, when executed, further cause the processor to:
optimize, by executing a linear programming model, the set of asset maintenance protocols corresponding to the set of assets based on the clustered vegetation by defining a dynamic trimming cycle for each asset of the set of assets.

16. The system of claim 9, wherein the set of computer-readable instructions, when executed, further cause the processor to:
determine the failure probability for each asset in the set of assets within the designated area based on at least one of (i) weather data corresponding to the designated area, (ii) historical outage data corresponding to the designated area, (iii) pole data corresponding to lines in the designated area, (iv) LIDAR data corresponding to the designated area, and (v) a trimming history corresponding to the designated area.

17. A non-transitory computer-readable storage medium having stored thereon a set of instructions, executable by at least one processor, for optimizing asset maintenance protocols by predicting vegetation-driven outages, the instructions comprising:
instructions for determining a failure probability for each asset in a set of assets within a designated area based on a vegetation coverage value and a vegetation density value determined from a 3D image of the designated area to predict a vegetation-driven outage;
instructions for defining an asset risk for each asset in the set of assets based on the failure probability;

instructions for clustering vegetation within the designated area based on the asset risk for each asset of the set of assets; and instructions for optimizing a set of asset maintenance protocols corresponding to the set of assets based on the clustered vegetation.

18. The non-transitory computer-readable storage medium of claim 17, wherein the instructions further comprise:
- instructions for obtaining a vegetation image representing the designated area;
- instructions for identifying vegetation within the designated area using the vegetation image;
- instructions for obtaining a 3D image including 3D point data representing the vegetation within the designated area;
- instructions for extracting a respective vegetation height for each vegetation represented by the 3D point data;
- instructions for a determining the vegetation coverage value and the vegetation density value based on the respective vegetation height;
- instructions for overlaying the vegetation image with utility lines included in the designated area; and
- instructions for quantifying a respective risk value for each utility line based on the vegetation coverage value and the vegetation density value.

19. The non-transitory computer-readable storage medium of claim 17, wherein the instructions further comprise:
- instructions for determining, by applying a machine learning (ML) model, the failure probability for each asset in the set of assets within the designated area, wherein the ML model is trained to receive a respective vegetation coverage value and a respective vegetation density value as inputs and to output a respective failure probability based on the respective vegetation coverage value and the respective vegetation density value.

20. The non-transitory computer-readable storage medium of claim 17, wherein the instructions further comprise:
- instructions for optimizing, by executing a linear programming model, the set of asset maintenance protocols corresponding to the set of assets based on the clustered vegetation by defining a dynamic trimming cycle for each asset of the set of assets.

* * * * *